(12) United States Patent
Tang et al.

(10) Patent No.: US 11,841,966 B2
(45) Date of Patent: Dec. 12, 2023

(54) INHIBITING MEMORY DISCLOSURE ATTACKS USING DESTRUCTIVE CODE READS

(71) Applicant: The Trustees of Columbia University in the City of New York, New York, NY (US)

(72) Inventors: Adrian Tang, New York, NY (US); Salvatore Stolfo, New York, NY (US); Lakshminarasimhan Sethumadhavan, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 17/550,559

(22) Filed: Dec. 14, 2021

(65) Prior Publication Data
US 2022/0284115 A1    Sep. 8, 2022

Related U.S. Application Data

(63) Continuation of application No. 15/753,270, filed as application No. PCT/US2016/045616 on Aug. 4, 2016, now Pat. No. 11,227,056.
(Continued)

(51) Int. Cl.
*H04L 9/40* (2022.01)
*G06F 21/62* (2013.01)
(Continued)

(52) U.S. Cl.
CPC ...... *G06F 21/6218* (2013.01); *G06F 9/45558* (2013.01); *G06F 12/1009* (2013.01);
(Continued)

(58) Field of Classification Search
CPC ............ G06F 21/6218; G06F 9/45558; G06F 12/1009
(Continued)

(56) References Cited

U.S. PATENT DOCUMENTS 6,014,513 A    1/2000 Voelker et al.
7,260,672 B2    8/2007 Garney
(Continued)

OTHER PUBLICATIONS

Athanasakis, M., Athanasopoulos, E., Polychronakis, M., Portokalidis, G., & Ioannidis, S. (2015). The Devil is in the Constants: Bypassing Defenses in Browser JIT Engines, presented at 2015 Network and Distributed System Security (NDSS) Symposium, San Diego, California, Feb. 7, 2015. Internet Society. Retrieved from https://www.ndss-symposium.org/wp-content/uploads/2017/09/09_1_2.pdf.
(Continued)

*Primary Examiner* — Anthony D Brown
(74) *Attorney, Agent, or Firm* — Occhiuti & Rohlicek LLP

(57) ABSTRACT

Disclosed are devices, systems, apparatus, methods, products, and other implementations, including a method that includes determining whether an operation to access a memory location containing executable code comprises a general-purpose memory access operation, and changing content of the memory location in response to a determination that the operation to access the memory location containing the executable code comprises the general-purpose memory access operation to the memory location.

20 Claims, 11 Drawing Sheets

Related U.S. Application Data

(60) Provisional application No. 62/236,257, filed on Oct. 2, 2015, provisional application No. 62/206,411, filed on Aug. 18, 2015.

(51) Int. Cl.
*G06F 21/52* (2013.01)
*G06F 9/455* (2018.01)
*G06F 12/1009* (2016.01)
*G06F 12/14* (2006.01)
*G06F 21/60* (2013.01)

(52) U.S. Cl.
CPC .......... *G06F 12/1475* (2013.01); *G06F 21/52* (2013.01); *G06F 21/604* (2013.01); *G06F 2009/45583* (2013.01); *G06F 2009/45595* (2013.01)

(58) Field of Classification Search
USPC .......................................................... 726/27
See application file for complete search history.

(56) References Cited

U.S. PATENT DOCUMENTS

| | | | |
|---|---|---|---|
| 8,503,257 B2* | 8/2013 | Post | G11C 16/349 365/201 |
| 8,839,429 B2 | 9/2014 | Komaromy et al. | |
| 8,856,789 B2 | 10/2014 | Torrey | |
| 9,015,834 B2 | 4/2015 | Salamat et al. | |
| 9,038,176 B2 | 5/2015 | Sallam | |
| 2008/0114944 A1 | 5/2008 | Holt | |
| 2013/0132690 A1 | 5/2013 | Epstein | |
| 2016/0085967 A1* | 3/2016 | Thomas | G06F 12/1408 713/166 |
| 2016/0170769 A1* | 6/2016 | LeMay | G06F 21/566 713/190 |

OTHER PUBLICATIONS

Backes, M., & Nurnberger, S. (Aug. 2014). Oxymoron: Making Fine-Grained Memory Randomization Practical by Allowing Code Sharing. In Proceedings of the 23rd USENIX Security Symposium, 433-447. Retrieve from https://www.usenix.org/system/files/conference/usenixsecurity14/sec14-paper-backes.pdf.

Backes, M., Holz, T., Kollenda, B., Koppe, P., Nurnberger, S., & Pewny, J. (Nov. 2014). You Can Run but You Can't Read: Preventing Disclosure Exploits in Executable Code. In Proceedings of the 2014 ACM SIGSAC Conference on Computer and Communications Security, 1342-1353. https://doi.org/10.1145/2660167.2660378.

Bletsch, T., Jiang, X., & Freeh, V. (Dec. 2011). Mitigating Code-Reuse Attacks with Control-Flow Locking. In Proceedings of the 27th Annual Computer Security Applications Conference, 353-362.

Bletsch, T., Jiang, X., Freeh, V. W., & Liang, Z. (Mar. 2011). Jump Oriented Programming: A New Class of Code-Reuse Attack. In Proceedings of the 6th ACM Symposium on Information, Computer and Communications Security, 30-40.

Crane, S., Liebchen, C., Homescu, A., Davi, L., Larsen, P., Sadeghi, A. R., . . . & Franz, M (May 2015). Readactor: Practical Code Randomization Resilient to Memory Disclosure. In 2015 IEEE Symposium on Security and Privacy, 763-780. IEEE. DOI: 10.1109/SP.2015.52.

Davi, L., Liebchen, C., Sadeghi, A. R., Snow, K.Z., & Monrose, F. (Feb. 2015). Isomeron: Code Randomization Resilient to (Just-in-Time) Return-Oriented Programming, presented at 2015 Network and Distributed System Security (NDSS) Symposium, San Diego, California, Feb. 7, 2015. Internet Society. http://dx.doi.org/10.14722/ndss.2015.23262.

Deng, Z., Zhang, X., & Xu, D. (Dec. 2013). Spider: Stealthy Bianry Program Instrumentation and Debugging Via Hardware Virtualization. In Proceedings of the 29th Annual Computer Security Applications Conference, 289-298. http://dx.doi.org/10.1145/2523649.2523675.

Dybdahl, H., Kjedsberg, P. G., Grannaes, M., & Natvig, L. (2006). Destructive-Read in Embedded DRAM, Impact on Power Consumption. Journal of Embedded Computing, 2 (2), 249-260.

Evans, I., Fingeret, S., Gonzalez, J., Otgonbaatar, U., Tang, T., Shrobe, H., . . . &Okhravi, H. (May 2015). Missing the Point (Er): On the Effectiveness od Code Pointer Integrity. In 2015 IEEE Symposium on Security and Privacy, 781-796. IEEE. DOI 10.1109/SP.2015.53.

Gionta, J., Enck, W., & Ning, P. (Mar. 2015). HideM: Protecting the Contents of Userspace Memory in the Face of Disclosure Vulnerabilities. In Proceedings of the 5th ACM Conference on Data and Application Security and Privacy, 325-336. http://dx.doi.org/10.1145/2699026.2699107.

Halderman, J.A., Schoen, S. D., Heninger, N., Clarkson, W., Paul, W., Calandrino, J. A., . . . & Felten, E. W. (2009). Lest We Remember: Cold-Boot Attacks on Encryption Keys. Communications of the ACM, 52 (5), 91-98. DOI:10.1145/1506409.1506429.

Homescu, A., Brunthaler, S., Larsen, P., & Franz, M. (Nov. 2013), librando: Transparent Code Randomization for Just-In-Time Compilers. In Proceedings of the 2013 ACM SIGSAC Conference on COmputer & Communications Security, 993-1004. https://doi.org/10.1145/2508859.2516675.

Intel. (2014). Intel 64 and IA-32 Architectures Software Developer's Manual—vol. 3C. Retrieved from https://www.intel.com/content/dam/www/public/us/en/documents/manuals/64-ia-32-architectures-software-developer-vol-3c-part-3-manual.pdf.

Kil, C., Jun, J., Bookholt, C., Xu, J., & Ning, P. (Dec. 2006). Address Space Layout Permutation (ASLP): Towards Fine-Grained Randomization of Commodity Software. In 2006 22nd Annual Computer Security Applications Conference (ACSAC'06), 339-348. IEEE. DOI: 10.1109/ACSAC.2006.9.

Lie, D., Thekkath, C., Mitchell, M., Lincoln, P., Boneh, D., Mitchell, J., & Horowitz, M. (2000). Architectural Support for Copy and Tamper Resistant Software_ ACM SGPLAN Notices, 35(11), 168-177.

Microsoft.(May 2018). Asynchronous Procedure Calls. Retrieved from https:l/msdn.microsoft.com/enus/library/windows/desktop/ms681951(v=vs.85).aspx on May 4, 2020.

Microsoft.(May 2018). Windows Resource Protection. Retrieved from https:l/msdn.microsoft.com/enus/library/windows/desktop/cc185681 (v=vs.85).aspx on May 4, 2020.

Nytro. (Feb. 2, 2014). Re: Mobile Pwn2own Autumn 2013 Chrome on Android Exploit Writeup [Online message board]. Retrieved from https:l/repo.zen k-security .com/T echniques%20d. attaques%20%20. %20%20Failles/Mobi le% ~0Pwn2Own%20Autumn%202013%20-%20Chrome%20on%20Android%20-%20Exploit%20Writeup_pdf.

Pappas, V., Polychronakis, M., & Keromytis, A_ D. (May 2012). Smashing the Gadgets: Hindering Return-Oriented Programming Using In-Place Code Randomization. In 2012 IEEE Symposium on Security and Privacy, 601-615. IEEE. DOI 10.1109/SP.2012.41.

Seibert, J_, Okhravi, H., & Soderstrom, E. (Nov. 2014). Information Leaks Without Memory Disclosures: Remote Side Channel Attacks on Diversified Code. In Proceedings of the 2014 ACM SIGGSAC Conference on Computer and Communications Security, 54-65. http:l/dx.doi.org/10.1145/2660267.2660309.

Shacham, H. (Oct. 2007)_ The Geometry of Innocent Flesh on the Bone: Retum-into-libc without Function Calls (on the x86). In Proceedings of the 14th ACM Conference on Computer and Communications Security, 552-561.

Snow, K. Z., Monrose, F., Davi, L., Dmitrienko, A., Liebchen, C., & Sadeghi, A. R. (May 2013)_ Just-In-Time Code Reuse: on the Effectiveness of Fine-Grained Address Space Layout Randomization. In 2013 IEEE Symposium on Security and Privacy, 574-588. IEEE_ DOI 10.1109/SP.2013.45.

Song, C., Zhang, C., Wang, T., Lee, W., & Melski, D. (Feb. 2015). Exploiting and Protecting Dynamic Code Generation, presented at 2015 Network and Distributed System Security (NOSS) Symposium, San Diego, California, Feb. 7, 2015. Internet Society. http:l/dx.doi.org/10.14722/ndss.2015.23233.

(56) References Cited

OTHER PUBLICATIONS

Sparks, S., & Butler, J. {Jan. 8, 2005). Shadow Walker: Raising the Bar for Rootkit Detection. Black Hat Japan,, 11(63), 504-533.

Torrey, J. {2014). MoRe Shadow Walker: TLB-splitting on Modern x86, presented at Black Hat USA 2014, Las Vegas, Nevada, Aug. 6-7, 2014. UBM Tech. Retrieved from https:/lwww.blackhat.com/us-14/archives.html#moreshadow- walker-the-progression-of-tlb-splitting-on-x86.

Van Oorschot, P.C., Somayaji, A., & Wurster, G. (2005). Hardware-assisted circumvention of self-hashing software tamper resistance. IEEE Transactions on Dependable and Secure Computing, 2(2), 82-92.

Wartell, R, Mohan, V., Hamlen, K. W., & Lin, Z. (Oct. 2012). Binary Stirring: Self-Randomizing Instruction Addresses of Legacy X86 Binary Code. In Proceedings of the 2012 ACM Conference on Computer and Communications Security, 157-168. https://doi.org/10.1145/2382196.2382216.

Wartell, R, Zhou, Y., Hamlen, K. W., Kantarcioglu, M., & Thuraisingham, B. (Sep. 2011). Differentiating Code from Data in x86 Binaries. In Joint European Conference on Machine Learning and KnowledgeDiscovery in Databases, Lecture Notes in Computer Science (LCNS), 6913, 522-536. Springer, Berlin, Heidelberg.https://doi .org/10 .1007 /978-3-642-23808-6_34.

\* cited by examiner

INHIBITING MEMORY DISCLOSURE ATTACKS USING DESTRUCTIVE CODE READS

CROSS-REFERENCE TO RELATED APPLICATIONS

This application is a continuation of U.S. application Ser. No. 15/753,270, filed Feb. 17, 2018, which claims the benefit of PCT Application No. PCT/US2016/045616, filed Aug. 4, 2016, which claims the benefit of, and priority to, U.S. Provisional Patent Application Ser. No. 62/236,257, entitled "INHIBITING MEMORY DISCLOSURE ATTACKS USING DESTRUCTIVE CODE READS," and filed Oct. 2, 2015, and U.S. Provisional Patent Application Ser. No. 62/206,411, entitled "INHIBITING MEMORY DISCLOSURE ATTACKS USING DESTRUCTIVE CODE READS," and filed Aug. 18, 2015, the contents of all of which are incorporated herein by reference in their entireties.

STATEMENT REGARDING FEDERALLY SPONSORED RESEARCH

This invention was made with government support under FA 87501020253 awarded by the Defense Advanced Research Projects Agency (SPARCHS), FA 865011C7190 awarded by the Defense Advanced Research Projects Agency (MRC), and CCF/SaTC 1054844 awarded by the National Science Foundation (NSF) CAREER. The government has certain rights in the invention.

BACKGROUND

With the widespread use of data execution protection, cyber attackers have turned to reusing code snippets from existing binaries to craft attacks. To perform these code reuse attacks, an attacker has to "see" the code so that the attacker can find the "gadgets" necessary to craft the attack payload. One solution to counter such attacks was based on fine-grained randomization approach. The idea is to shuffle the code to blind the attacker from seeing the code layout in memory. The assumption behind this approach is that without knowledge of the code layout, the attacker cannot craft payloads. However, it is feasible to scan for ROP (return-orientation programming) gadgets at runtime and construct a dynamic just-in-time (JIT) attack payload. Such an attack undermines the use of fine-grained randomization as a mitigation against ROP attacks.

A solution that was proposed to counter the threat of constructing JIT attack payloads is based on the idea of execute-only memory (XOM) approach. This approach involves preventing programs from reading executable memory using general purpose memory access instructions. One challenge in realizing these systems, however, is that legacy binaries and compilers often intersperse code and data (e.g. jump tables) in executable memory pages. Thus, the wholesale blinding of executable memory at page granularity may not be practical. Although static compilation techniques may be used to separate code and data, this solution does not work well in the absence of source code, for instance, when utilizing legacy binaries. Another complication in realizing the XOM concept arises from web browsers' use of JIT code where data becomes dynamically generated code. This has been shown to be a significant attack surface for browsers.

SUMMARY

In some variations, a method is provided that includes determining whether an operation to access a memory location containing executable code comprises a general-purpose memory access operation, and changing content of the memory location in response to a determination that the operation to access the memory location containing the executable code comprises the general-purpose memory access operation to the memory location.

Embodiments of the method may include at least some of the features described in the present disclosure, including one or more of the following features.

Determining whether the operation to access the memory location containing the executable code comprises the general-purpose memory access operation may include determining whether the operation to access the memory location comprises one or more of, for example, a memory read operation, and/or a memory dereferencing operation.

The method may further include identifying at run-time one or more areas of memory of a computing system as containing portions of executable code, and associating the one or more areas of the memory of the computing system with respective access permissions associated with the portions of executable code.

Determining whether the operation to access the memory location containing the executable code comprises the general-purpose memory access operation may include determining whether the operation to access the memory location violates the respective access permission associated with an area of memory, from the one or more areas of memory, that includes the memory location containing the executable code.

Associating the one or more areas of the memory of the computing system with the respective access permissions associated with the portions of executable code may include maintaining in a hardware virtualization module, configured to map virtual memory addresses to physical host machine addresses, execution information identifying the one or more areas of the memory containing the portions of the executable code as being execute-only memory areas. The method may further include causing a hardware-virtualization violation in response to the determination that the operation to access the memory location is the general-purpose memory access and a further determination that the memory location being accessed is in a memory area from the one or more areas of the memory identified as the execute-only memory areas.

The method may further include generating a duplicate copy of the one or more areas of the memory, configured with the respective access permissions associated with the portions of executable code, in another one or more areas of the memory.

Changing the content of the memory location in response to the determination that the operation to access the memory location containing the executable code comprises the general-purpose memory access operation to the memory location may include replacing the content of the memory location with a random value in response to the determination that the operation to access the memory location containing the executable code comprises the general-purpose memory access operation to the memory location.

Changing the content of the memory location in response to the determination that the operation to access the memory location containing the executable code comprises the general-purpose memory access operation to the memory location may include replacing the content of the memory location with a selected one of one or more pre-determined values associated with respective one or more software interrupts or software traps.

The method may further include performing a software interrupt based on the replaced content of the memory location to cause a capture of data associated with one or more processes resulting in the software interrupt. The captured data associated with the one or more processes resulting in the software interrupt may be used to perform one or more of, for example, identifying a malware attack that caused the software interrupt, identifying vulnerabilities in a targeted program comprising the executable code in the memory location, repairing one or more of the identified vulnerabilities, and/or providing output information to a user regarding the software interrupt.

The method may further include receiving reply information from the user responsive to the output information provided to the user, and performing based on the received reply information from the user one of, for example, terminating execution of the targeted program, or restoring execution of the targeted program.

The method may further include identifying from received input data one or more executable code portions and one or more non-executable data portions, and placing the one or more executable code portions in first areas of memory.

Identifying from the received input data the one or more executable code portions and the one or more non-executable data portions may include performing disassembly processing on the received input data to generate resultant disassembled data, and identifying from the resultant disassembled data the one or more executable code portions and the one or more non-executable data portions.

Identifying from the received input data the one or more executable code portions and the one or more non-executable data portions may include determining whether portions of the received input data match one or more pre-defined data structures to identify the one or more non-executable data portions, and placing the identified non-executable data portions into second areas of the memory, separate from the first areas in which the executable code portions are placed.

In some variations, a computing system is provided that includes at least one processor, and memory including computer instructions that, when executed on the at least one processor, cause operations including determining whether an operation to access a memory location containing executable code comprises a general-purpose memory access operation, and changing content of the memory location in response to a determination that the operation to access the memory location containing the executable code comprises the general-purpose memory access operation to the memory location.

In some variations, an apparatus is provided that includes means for determining whether an operation to access a memory location containing executable code comprises a general-purpose memory access operation, and means for changing content of the memory location in response to a determination that the operation to access the memory location containing the executable code comprises the general-purpose memory access operation to the memory location.

In some variations, a computer readable media is provided, storing a set of instructions executable on at least one programmable device that, when executed, cause operations including determining whether an operation to access a memory location containing executable code comprises a general-purpose memory access operation, and changing content of the memory location in response to a determination that the operation to access the memory location containing the executable code comprises the general-purpose memory access operation to the memory location.

Embodiments of the computing system, the apparatus, and the computer-readable media may include at least some of the features described in the present disclosure, including at least some of the features described above in relation to the method.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

Like reference symbols in the various drawings indicate like elements.

DESCRIPTION

Figure 1:
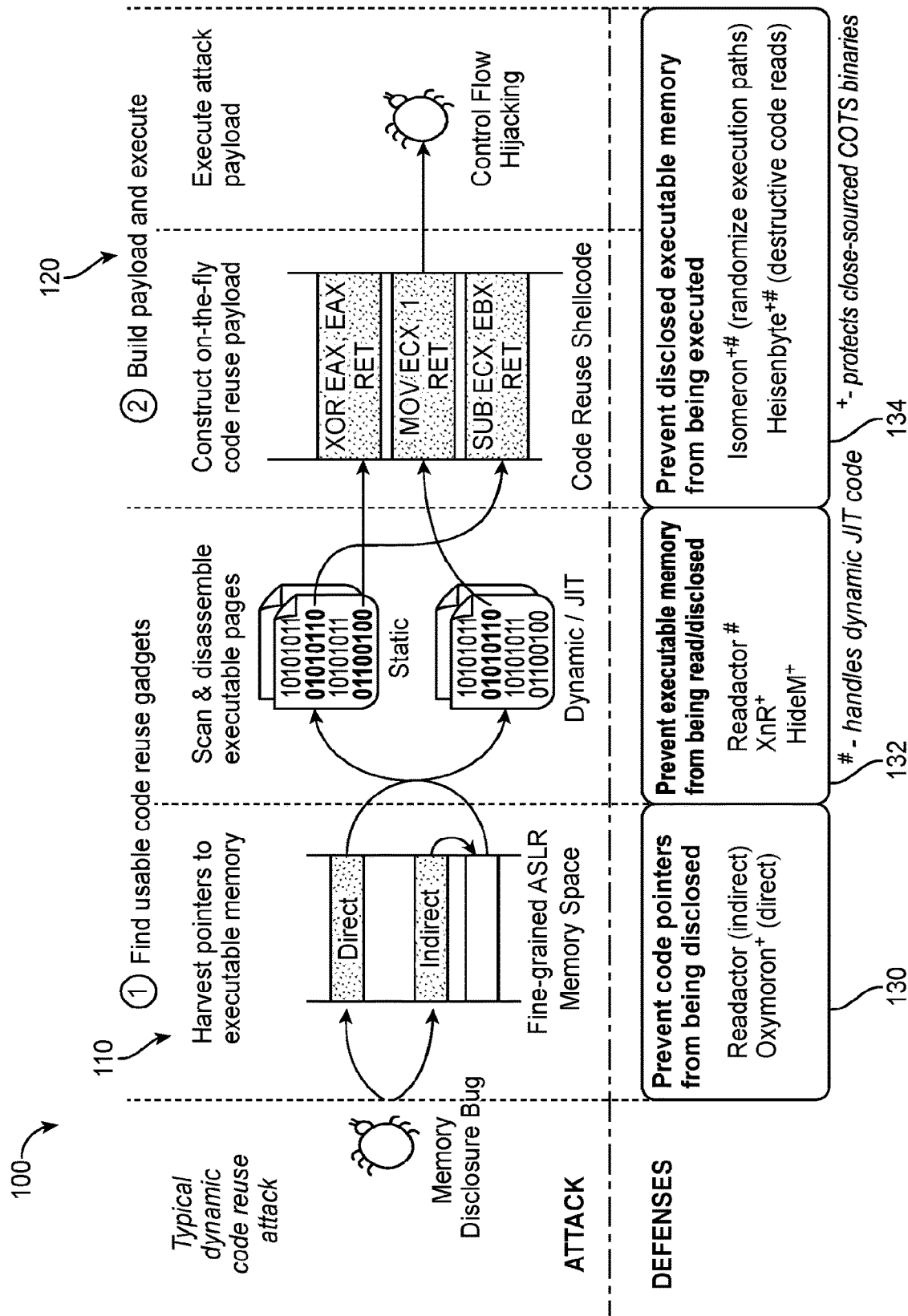
FIG. 1 is a diagram of an attack flow for a dynamic code reuse attack, and various protection mechanisms that may be provided to protect against such an attack.

Described herein are systems, devices, apparatus, methods, computer program products, media, and other implementations to inhibit/prevent memory disclosure attacks (including code reuse attacks that build the attack payload at runtime) through destructive code reads processes. In some embodiments, a system implementation called "Heisenbyte" is provided, which is configured to protect against memory disclosure attacks. An important concept of the Heisenbyte implementation is the use of destructive code reads in which code is changed (e.g., garbled) right after it is read. Garbling the code after reading it removes or restricts an attacker's ability to leverage memory disclosure bugs in both static code and dynamically generated just-in-time (JIT) code. By leveraging existing virtualization support, Heisenbyte's use of destructive code reads may sidestep the problem of incomplete binary disassembly in binaries, and extend protection to close-sourced COTS binaries (which are two major limitations of prior solutions against memory disclosure vulnerabilities). Experimentations and evaluation of the systems implemented demonstrated that Heisenbyte can tolerate some degree of imperfect static analysis in disassembled binaries, while effectively thwarting dynamic code reuse exploits in both static and JIT code, at a modest 18.3% average runtime overhead, 1.8% of which is virtualization overhead.

Unlike execute-only memory (XOM)-inspired systems that aim to completely prevent reads to executable memory (a task beset with many practical difficulties), the implementations described herein allow executable memory to be read, but make the executable memory read unusable as code after being read. The operations rendering executable code that is read is dubbed "destructive code reads". In the approaches described herein, as soon as the code is read (e.g., using a general-purpose memory dereferencing instruction), it becomes corrupted. Manipulating executable memory in this manner allows legitimate code to execute substantially without false-positives and false-negatives, while servicing legitimate memory read operations. In some embodiments, the new code read mechanism discussed herein may be implemented in software by leveraging existing virtualization hardware support on commodity processors.

The use of destructive code reads described herein restricts adversaries' ability to leverage executable memory that are exposed using memory disclosure bugs as part of an attack. The technique(s)/approaches implemented in Heisenbyte may be realized using existing hardware virtualization support to identify read operations on executable memory. The Heisenbyte implementation described herein causes disclosed (e.g., read or accessed) executable memory to not execute as intended, while still tolerating some degree of data not removed from the code pages.

Thus, in some embodiments, methods, systems, devices, media, and other implementations are provided that include a method including determining whether an operation to access a memory location containing executable code comprises a general-purpose memory access operation (e.g., a memory read operation), and changing content of the memory location in response to a determination that the operation to access the memory location containing the executable code comprises the general-purpose memory access operation to the memory location. In some embodiments, the method may further include identifying at runtime one or more areas of memory of a computing system as areas configured to contain portions of executable code, and configuring the one or more areas of the memory of the computing system with respective access permissions associated with the portions of executable code.

In some embodiments, changing the content of the memory location may include replacing the content of the memory location with a random value in response to the determination that the operation to access the memory location containing the executable code comprises the general-purpose memory access operation to the memory location. In some embodiments, changing the content of the memory location in response to the determination that the operation to access the memory location containing the executable code comprises the general-purpose memory access operation to the memory location may include replacing the content of the memory location with a selected one of one or more pre-determined values associated with respective one or more software interrupts or software traps. The method may thus further include, in some embodiments, performing a software interrupt based on the replaced content of the memory location to cause a capture of data associated with one or more processes resulting in the software interrupt, with the captured data associated with the one or more processes resulting in the software interrupt being used to perform one or more of, for example, identifying a malware attack that caused the software interrupt, identifying vulnerabilities in a targeted program comprising the executable code in the memory location, repairing one or more of the identified vulnerabilities, and/or providing output information to a user regarding the software interrupt. In some embodiments, the method may further include receiving reply information from the user responsive to the output information provided to the user, and performing based on the received reply information from the user one of, for example, terminating execution of the targeted program, or restoring execution of the targeted program.

As noted, the systems, methods, and other implementations described herein, are configured to protect against malicious attacks such as, for example, dynamic code reuse attacks. FIG. 1 is a diagram of an example attack flow 100 for a dynamic code reuse attack, and various protection mechanisms (that include implementations such as the Heisenbyte system described herein) that may be provided to protect against such an attack. A typical dynamic code reuse attacks includes two stages: 1) a search stage 110 to search for usable code reuse gadgets in either static code or dynamic JIT code, and 2) a payload construction stage 120 during which the attacker builds the payload on-the-fly and then redirects execution to the payload. In the first stage 110, to gather code reuse gadgets for a dynamic exploit, an attacker/adversary needs to first uncover memory pages that are executable. Generally, a linear scan of the memory is not used as it is likely to trigger a page fault or access unmapped guard pages placed randomly in the address space. Therefore, to craft a stable exploit, the adversary has to first gather pointers to the memory pages marked as executable. These pointers can be direct branches into executable memory or indirect pointers residing in data pages but pointing to code memory. With the list of the pointers to executable memory, the attacker/adversary can then invoke a memory disclosure bug repeatedly (without crashing the vulnerable program) to scan and disassemble the memory pages looking for suitable code reuse gadgets. The next step (at stage 120) involves stringing the locations of the gadgets together in an exploit payload, and finally redirecting execution to this payload using another control flow hijacking vulnerability.

To protect against attacks such as code reuse attacks, several protection mechanisms are indicated in FIG. 1. For example, a first category of defenses (identified as mechanisms 130) focuses on protecting the code pointers and preventing them from being disclosed, stifling the attack as earlier as possible. An oxymoron protection mechanism hides the direct code pointers by generating randomized code that does not have direct references to code pages. With this approach, however, adversaries can use indirect code references that reside in stack and heap. A readactor protection mechanism addresses this by masking the indirect code references with executable trampolines that are protected by hardware virtualization feature.

A second category of protection mechanism (marked as mechanisms 132), which may be used during the search stage 110 of the attack, is based on the concept of execute-only memory implemented in software. This is configured to prevent/inhibit executable memory from being disclosed directly through memory read operations, consequently removing the adversary's ability to scan and locate suitable code reuse sequences for the attack. To achieve this, these mechanisms have to separate legitimate data from executable sections of programs, and distinguish at runtime between code execution and data read operations in executable memory. An XnR process (one mechanism from the mechanisms 132) configures executable pages to be non-executable, and augments the page fault handler to mediate illegal reads into code pages. This approach, however, is susceptible to disclosure attacks via indirect code references. The HideM process (another of the mechanisms 132) leverages, for example, the spilt-TLB architecture on AMD processors to transparently prevent code from being read by memory dereferencing operations. The use of split-TLB limits its ability to remove all data from the executable sections, and inevitably exposes these data remnants to being used in attacks. The Readactor process (a further one of the mechanisms 132) relies on compiler-based techniques to separate legitimate data from code in programs and uses hardware virtualization support to enforce execute-only memory.

Unlike defenses that protect the executable memory from illegal memory reads, a third category of protection mechanisms 134 tolerates the disclosure of executable memory contents in attacks. The mechanisms 134 shift the focus of the defense strategy to preventing/inhibiting any discovered gadgets from earlier attack stages from being used in later stages of the attacks. Belonging to this class of defenses is the Isomeron probabilistically approach that impedes the use of the discovered gadgets by randomizing the control flow at runtime specifically for dynamically generated code. As also shown, another approach in this category of protection mechanisms are the systems, methods, and other implementations described herein, including the Heisenbyte approach, which are configured to determine whether an operation to access a memory location containing executable code includes a general-purpose memory access operation, and to change content of the memory location in response to a determination that the operation to access the memory location containing the executable code comprises the general-purpose memory access operation to the memory location. While some approaches either enforce execute-only code memory or hide important static code contents from adversaries, in the implementations provided herein the destructive changes made to executable memory (when it is read) are concealed from the adversaries. An implementation such as the Heisenbyte system thus allows legitimate read operations to disclose the contents of executable memory while keeping changes (randomized or pre-determined changes) made to the memory read hidden. This allows the mechanism to transparently support existing COTS binaries without the need to ensure all legitimate data and code are separated cleanly and completely in the disassembly. The operability of the Heisenbyte system is based on the assumption that every byte in the executable memory can only be exclusively used as code or data.

In realizing the systems, methods and other implementations described herein, the assumption made is that an attacker/adversary can read (and write) arbitrary memory within the address space of the vulnerable program, and do so without crashing the program. It is also assumed that a target system is equipped with the following protections:

W⊕X: Memory pages cannot be both executable and writable at the same time. This prevents direct overwriting of existing code or injection of native code into the vulnerable program. It is assumed that this also applies to JIT code generated by programs, i.e. dynamically generated instructions cannot be executed on a memory page that is writable.

Load-time fine-grained ASLR: All the static code from programs and libraries are loaded at random locations upon each startup. Address Space Layout Randomization (ASLR) reduces the predictability of the code layout. Furthermore, code layouts are required to be randomized at a fine granularity so that the registers used and instruction locations within a function or basic block are different. Without this, an attacker/adversary may be able to find code pointers in non-executable memory and infer the code layout of the rest of the memory without directly reading them.

Defenses against JIT attacks: It is also assumed that fine-grained ASLR is applied to JIT engines, necessitating an adversary to perform a scan of the JIT memory pages to locate usable code reuse gadgets.

Figure 2:
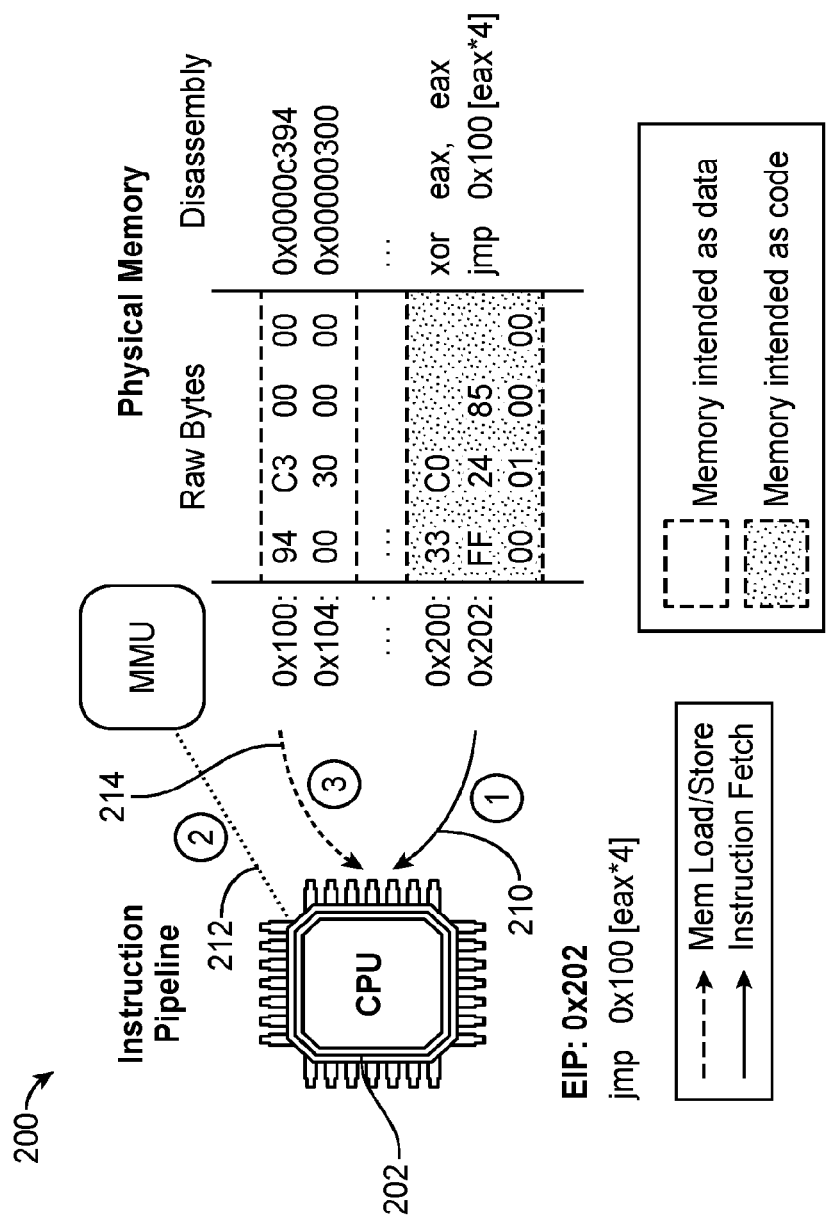
FIG. 2 is a diagram depicting the stages in a normal execution of an example jmp instruction (i.e., without the use of the destructive code read approach).

To illustrate the principles of operation of the destructive code read approaches described herein, consider FIG. 2, which is a diagram 200 depicting the stages in a normal execution of a jmp instruction (i.e., without the use of the destructive code read approach). To aid explanation, the raw byte representation, as well as its disassembled instructions, are presented. Without loss of generality, 4 kB memory pages are used in the example embodiments described herein. While the bytes that are intended to be read as data have been demarcated from those intended to be executed as code, it will be noted that the processor is oblivious to this; all the processor knows of is the access permissions of a given memory page. In Operation 1 of FIG. 2 (also marked as operation 210), a processor 202 (e.g., a CPU or some other type of controller) performs a code fetch of the jmp instruction from the 0x202 address pointed to by the Extended Instruction Pointer (EIP). The instruction is decoded and the CPU 202 determines that it needs to dereference the memory at a base address of 0x100 and an offset given by the register eax for its branching destination. Because the address 0x100 is in the virtual addressing mode, the CPU has to, in Operation 2 (also marked as operation 212), translate the address to the corresponding physical address via the Memory Management Unit (MMU). For simplicity, an identity mapping of the virtual to physical addresses is assumed. Subsequently, the CPU dereferences the address 0x100 via a memory load operation in Operation 3 (also marked as operation 214), and completes the execution of the jmp instruction.

Figure 3:
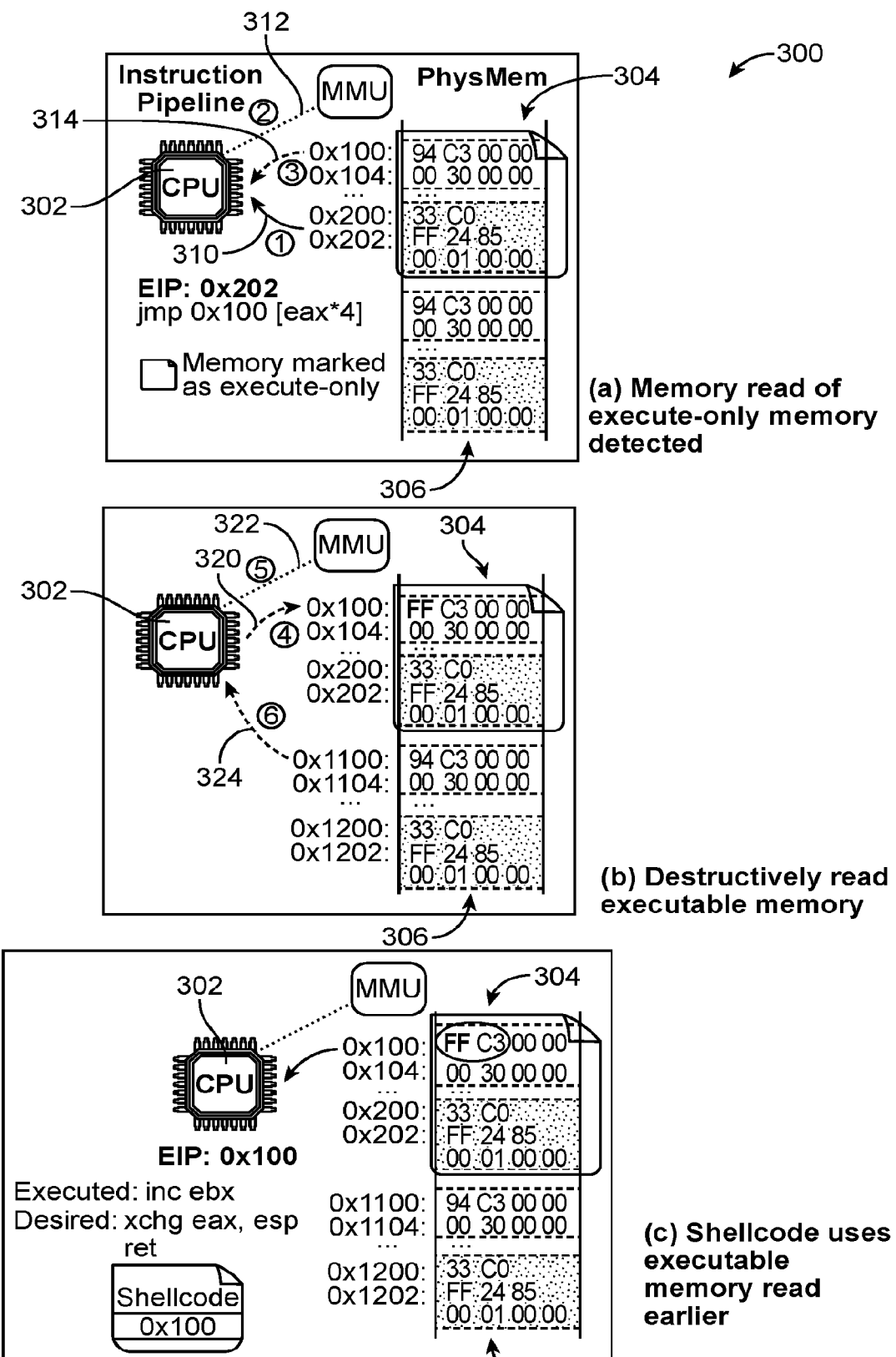
FIG. 3 is a diagram of an example destructive code read implementation.

In contrast, FIG. 3 is a diagram of an example destructive code read implementation 300 in which a jmp instruction is executed on the processor 302 (which may be similar to the processor/controller 202 of FIG. 2). For the purposes of illustration, a Windows operating system is assumed, but the example implementation 300 may be used with other types of operating systems, realized within different types of computing hardware configurations. Every Windows program binary generally comes with a PE header that may be used to parse and identify all static memory sections that are marked as executable. As shown in FIG. 3(a), a duplicate copy of these memory pages is maintained to be used as data in the event of a memory read dereferencing operation. The duplicate copy of the executable memory page should be available whenever an instruction accesses any part of that page as data. In some embodiments, all executable memory pages may be duplicated at process startup. Alternatively, in some embodiments, memory pages may be duplicated on-demand, e.g., an executable memory page would be duplicated when any part of it is dereferenced by an instruction as data. Further, in order to detect read operations in the executable memory page, a page needs to be marked as execute-only. In FIG. 3(a), a duplicate memory page 306 is shown directly below an executable page 304. As in the example of FIG. 2, an instruction is fetched at Operation 1 (marked as 310), and the memory address of the data to be dereferenced is translated via the MMU in Operation 2 (marked as operation 312). When a memory dereferencing for the data address occurs at Operation 3 (marked as operation 314), this invokes a memory access violation because the memory address being dereferenced is located in a memory section identified/marked as an execute-only memory.

Upon occurrence of a memory read operation of a memory address located in a memory section marked as execute-only memory, destructive read code operations are performed, as illustrated in FIG. 3(*b*). Specifically, the byte at the faulting memory address is overwritten, in Operation 4 (also marked as operation 320) with, in some embodiments, a random byte. As will be discussed in greater detail below, in some embodiments, the content of the faulting memory address may be overwritten with one or more of pre-determined values to facilitate graceful termination operations (and/or facilitate other types of graceful remediation operations with respect to the computing attacks). Thus, for example, as depicted in the example of FIG. 3(*b*), the content '94 C3 00 00' of the memory location 0x100 being accessed through the dereferencing operation is replaced with the value 'FF C3 00 00' (i.e., the byte comprising the previous value '94' is replaced with a byte value of 'FF'). In Operation 5 (also marked as operation 322) the virtual address of the memory read is redirected, via the MMU, to a different physical address that points to the duplicate page. The read operation can then be serviced transparently with the original data value in Operation 6 (also marked operation 324), and the instruction (e.g., the jmp instruction, in this example) that uses that data can function normally.

Since code and data are serviced by separate memory pages depending on the operation, the bytes that are read from executable memory pages may no longer be the same as the ones that can be executed at the same virtual address. In the example of FIG. 3(*b*), a legitimate application has dereferenced the memory address 0x100 as data, causing the code memory address at 0x100 to now contains a randomized byte. Executing the instruction at this address could lead to unintended operations. For instance, in FIG. 3(*c*), if the adversary uses a memory disclosure bug to read the memory contents of 0x100, the adversary/attacker will see the original byte sequence '94 C3', which represents a commonly found stack pivot gadget2. The adversary, thinking that it has found the stack pivot gadget, may set up a dynamic code reuse payload to use the address 0x100. However, because the earlier code read operation has "destroyed" the byte there with the random byte 'FF', when the code reuse payload executes the instruction at address 0x100, the garbled byte sequence 'FF C3' is executed as an inc ebx instruction. This effectively stems the further progress of the exploit.

Use of destructive code reads (as described herein) at runtime is motivated by the difficulty of distinguishing disassembled bytes intended to be data from those intended to be instructions during runtime. This leads to the adoption of a different strategy from that employed by conventional approaches that enforce execute-only memory using compiler-based techniques. Instead of relying on determining the code or data nature of bytes (e.g., during offline static analysis), and enforcing runtime execute or read policies based on this, in the implementations described herein, the code/data nature of bytes may be inferred at runtime (some of the analysis may be performed offline, as will be discussed below in greater detail), the inferred data bytes in executable memory are identified, and the possibility of using those identified bytes as executable code during attacks is mitigated.

Accurately identifying data in executable sections of memory pages presents several challenges. One such challenge is that of the "halting" problem. Legitimate data need to be separated out from the disassembled bytes of the executable sections of the binaries. To do so requires making a judgment on whether or not a range of bytes is intended to be used as data at runtime. While heuristics can be used to make that judgment, this code or data separation task at binary level reduces to the halting problem because it can generally only be determined at runtime when bytes are truly intended to be code, and yet it would be desirable to do this during static analysis. Another challenge associated with the identification of data in executable sections of memory pages is that of JIT code generation. Web scripting languages such as Javascript are optimized for efficient execution by modern web browsers using just-in-time compilation. While the newer versions of web browsers like Internet Explorer and Mozilla Firefox separate the code and data into different memory pages, with the latter in non-executable ones, older versions may provide both code and data on same executable pages. The implementations described herein should, preferably, support the use of these legacy JIT engines.

Yet another challenge associated with the identification of data in executable sections of memory pages is that of "corner" cases. In analyzing Windows shared libraries, it was found that there are many corner cases where the disassembler cannot accurately determine statically if a chunk of bytes is intended to be data or code. This stems from the limitations of the disassembly heuristics used by the disassembling engine. A common example of incorrect disassembly is the misclassification of isolated data bytes as 'RET' return instructions within a data block. A RET instruction is represented in assembly as a one-byte opcode, and can potentially be a target of computed branch instructions whose destination cannot be statically determined. Therefore, the disassembler frequently misclassifies data bytes that match the opcode representation of return instructions as code. There are also some situations in which it is assumed that code and data sections are located in a specific layout. For example, in kernel32.dll, a shared library used by Windows binaries, the relocation section indicates a chunk of bytes that are dereferenced as data at the base of the executable '.text' section. Because a readable and writable data section '.data' generally follows this '.text' section, any instruction referencing this data also assumes that 400 bytes following this address has to be a writable location. This structural assumption is difficult to discern during offline static analysis. If this data is blindly relocated from the executable '.text' section to another section without respecting this structural assumption, a crash may occur.

As noted, legacy COTS binaries (e.g., Windows native programs and libraries) have substantial amount of legitimate data interleaved with code in the executable sections. Blindly retaining these data can lead to exorbitant overheads in the implementations described herein (e.g., the Heisenbyte implementation) as read access to each of these data items in the executable memory will incur the overhead of the destructive code read operation. To mitigate these overheads, a conservative static analysis may be performed to determine well-defined data structures that can be safely relocated out of the executable sections without affecting the functionality of the program. For instance, in many legacy Windows binaries, the read-only data sections are merged with the code section. This is not a problem because the format for the data section is well-documented. Similarly, well-structured data chunks like strings, jump tables and exception handling information, can be handled. More particularly, some examples of legitimate data chunks that are commonly interspersed with code in the executable sections of program code (e.g., Windows COTS binaries) include:

Standard data sections—Many Windows native binaries have the standard non-executable data-only sections embedded within the executable '.text' section. Examples include the Import Address Table, the Export Address Table and debug configuration section, etc.

Merged data sections—An optimization technique to minimize the file sizes of programs is to merge the read-only data section ('.rdata') and the main executable section ('.text'). This technique is commonly used in Windows native binaries and shared DLL libraries. Two types of read-only data that are targeted (because they are well defined) include strings and Structured Exception handler (SEH) structures.

Jump tables—High-level switch statements are implemented as jump instructions and jump tables in assembly. Compilers typically position the jump table offsets near the jump instructions that use jump tables. These jump tables are intended to be dereferenced at runtime.

Figure 4:
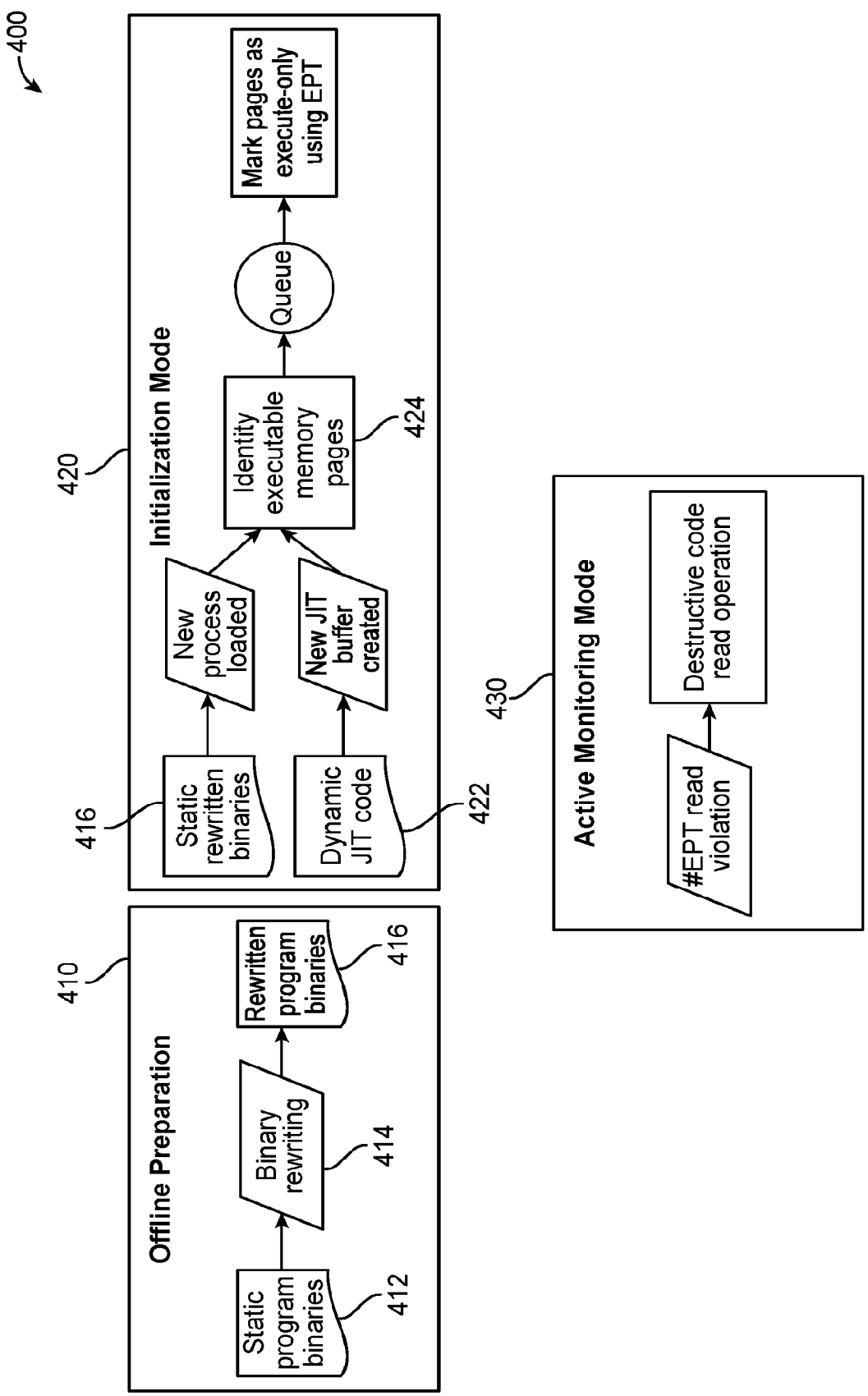
FIG. 4 is a schematic diagram of an example implementation to protect computing processes and programs by using destructive memory reads processes.

With reference now to FIG. 4, a diagram of an implementation 400, such as the Heisenbyte implementations described herein, to protect computing processes and programs from malicious attacks through a destructive memory read approach, is shown. The implementation 400 includes an offline-preparation stage 410 in which code (e.g., program binaries) that are to be protected are re-written into separate data portions and code portions. The implementation 400 further includes an initialization stage 420 is configured to identify at runtime (e.g., at a process 424) selected executable memory pages to protect, and subsequently to configure execute-only access permissions for these pages. As will be discussed in more details below, identifying executable memory pages for static rewritten binaries may be performed, in some embodiments, using OS kernel-provided callback functionality. User-defined callback functions can be registered with the OS to execute when certain events are invoked. For the purpose of identifying executable memory pages that are to be protected, callback functions are registered to execute whenever whitelisted programs or libraries are launched. These functions are then set-up to bootstrap the initialization of the data structures to support the destructive code read operations.

On the other hand, identifying executable memory pages for dynamic JIT code (such as the code 422) may be performed based on monitoring when new JIT buffers are created. As will be described in greater detail below, to identify executable JIT memory, instead of using callback functions, in-line memory hooking of specific memory allocation APIs may be performed to achieve the desired effects of callback functions.

Once the set of executable pages are configured with the desired permissions (e.g., by setting/specifying appropriate execute-only permission identifiers on, for example, extended page tables (EPT) that provide a mapping between a guest-physical address space and a host machine address space), an active monitoring stage 430 is then responsible for performing the destructive code read operation when it detects a read operation to an executable page.

As shown, the offline-preparation stage 410 includes a rewriting engine 414 that receives as input static program code 412, and identifies from the input code executable code portions and data portions, thus producing output data comprising rewritten program binaries 416. Data portions may be relocated to data sections within a system's memory, while portions identified to be executable code portions are placed in separate sections of the system's memory reserved for executable code.

In some embodiments, to identify portions within input code processed by the stage 410 as data or executable instructions, disassembler systems, such as, for example, the commercial IDA Pro system, may be used to generate disassembled code for the programs. Disassembler processes applied to the input data may also be used to identify well-defined data structures commonly found in executable memory pages. The rewriting engine 414 is configured to determine whether a range of bytes within the disassembled data corresponds to data records (i.e., non-executable data) that needs to be relocated to a separate data section. The engine 414 may be configured to reconstruct a PE header to add a new non-executable section to consolidate all these identified data. Relocation information is important in aiding both static analysis and relocation operations. For example, if a range of data bytes needs to be relocated to another section, the relocation table is updated either by adding new relocation entries or editing existing ones to reflect the new location of the relocated data. Relying on the relocation tables allows to transparently move bytes around within a PE file without breaking the functionality of the program.

Thus, in some embodiments, a process is provided that includes identifying from received input data one or more executable code portions and one or more non-executable data portions, and placing the one or more executable code portions in first areas of a computing system's memory. In such embodiments, identifying from the received input data the one or more executable code portions and the one or more non-executable data portions may include performing disassembly processing on the received input data to generate resultant disassembled data, and identifying from the resultant disassembled data the one or more executable code portions and the one or more non-executable data portion. Also, in some of such embodiments, the process may also include identifying, from the input data, non-executable data portions matching one or more pre-defined data structures, and placing the identified non-executable data portions into second areas, separate from the first areas in which the executable code portions are placed.

To evaluate rewritten Windows native library files with the Heisenbyte implementations, the original files need to be replaced. However, on Windows, critical shared libraries and program binaries are protected by a mechanism called Windows Resource Protection (WRP). WRP prevents/inhibits unauthorized modification of essential library files, folders and registry entries by configuring the Access Control Lists (ACLs) for these protected resources. Generally, only the Windows Installer service, TrustedInstaller, has full permissions to these resources. To get around this problem, ownership of the protected files from was seized from the TrustedInstaller account using the command takeown.exe, and by relying on the evaluator's system privileges, to grant full access rights for the protected files using icacls.exe. At this point, the files can be renamed, but cannot be replaced because they are still in use. The files are therefore renamed and the rewritten binaries are copied with the original filename. When the system is rebooted, the rewritten libraries can then be loaded into the system. To ensure integrity of the binaries, the modified ACLs of the protected binaries are restored after the rewritten binaries are replaced. This technique of deploying rewritten Windows native files work for most of the binaries with one exception—ntdll.dll. The integrity of this file can be verified when the system starts up. This may be achieved by disabling the boot-time integrity in the bootloader, so that the rewritten ntdll.dll binary can be loaded.

Figure 5:
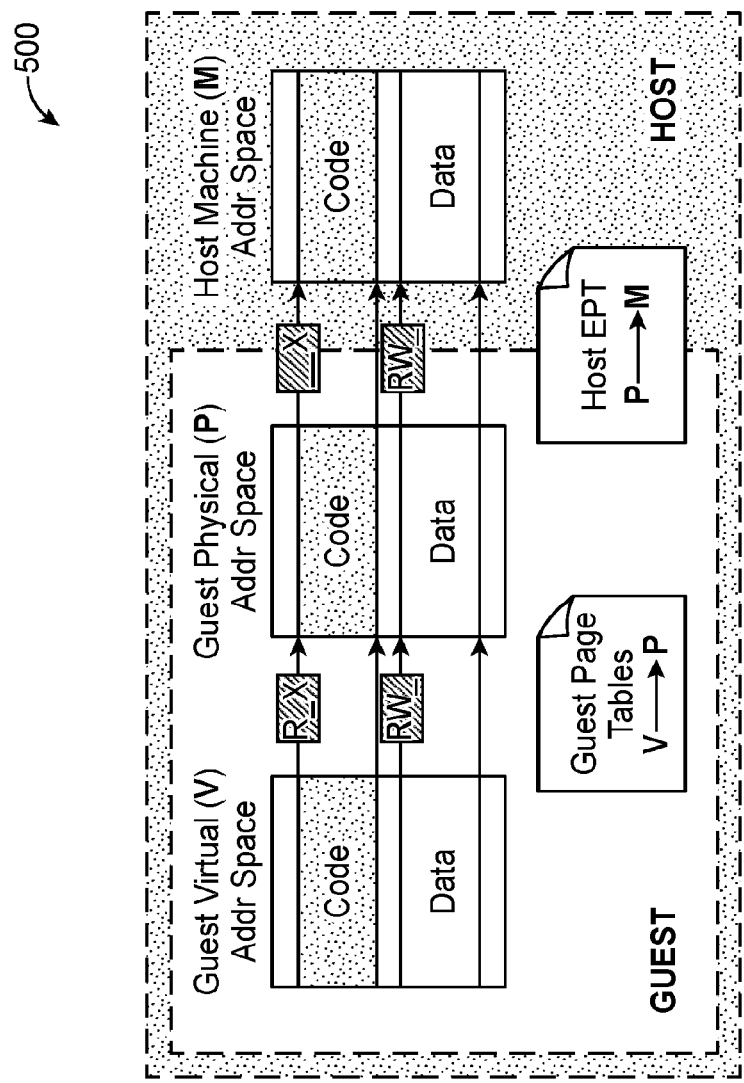
FIG. 5 is a diagram of an example nested paging structure using virtualization hardware support.

As noted, the implementations described herein are configured to detect when executable memory is being read. There are a number of ways to do this, which include, for example, mediating at the page fault handler, leveraging the split-TLB microarchitecture of systems, etc. These solutions stem from the limitation of some available operating systems to not being able to enforce execute-only permissions on memory pages. However, hardware virtualization support on commercial processors (e.g., hardware-assisted nested paging realized using an extended page tables (EPT) mechanism for Intel-based processors, nested-page-tables (NPT) for AMD-based processors) provides a way to enforce fine-grained execute-only permissions on memory pages. For the purpose of illustration, the discussion provided herein refers to EPT hardware, but is also applicable to other types of virtualization support hardware. This hardware feature augments existing page walking hardware with the ability to traverse in hardware the paging structures, mapping guest physical (P) addresses to host machine (M) addresses. This eliminates the overhead involved in maintaining shadow page tables using software. A virtualization-enabled MMU may be configured to map virtual (V) addresses in the guest address space to machine physical addresses in the host, using, in some embodiments, both the guest page tables and the host second-level page tables. This may be done transparently of the guest OS. FIG. 5 is a diagram 500 depicting a nested paging structure using virtualization hardware support, with three address spaces spanning across the guest and host modes. In the guest mode, the page tables store the V→P address mappings, as well as the corresponding permission bits. These guest page tables cannot be configured with solely the execute bit set. Conversely, in the host, virtualization support hardware, such as the EPTs, maintains the P→M address mappings. The key difference between the EPTs and guest page tables is that the EPTs can configure each page mapping as execute-only. When an access to a memory page violates the permissions configured for that page, an #EPT violation is invoked, transferring control to a hypervisor. This mechanism allows detection of read operations to executable memory. Some of the implementations described herein rely on hardware-assisted EPT to configure guest physical memory pages as execute-only with no read or write access. Because this is a virtualization-assisted technology, virtualization has to be provided on the system being protected. On systems that need to protect existing virtualized guests, implementation, such as the Heisenbyte implementation, can be realized within the Virtual Machine Monitor (VMM) software, such as Xen or KVM. However, the need for virtualization does not preclude the protection of non-virtualized systems. For example, a Heisenbyte implementation was realized for the non-virtualized Windows operating system. Particularly, a Windows driver implementation of a Heisenbyte system was developed that configured the EPT paging structures, enabled virtualization mode, and placed the execution of the non-virtualized OS into virtualized guest mode (non-root VMX mode). In that case, the implemented Heisenbyte system did this on a live running system, without requiring any system reboot.

Figure 6:
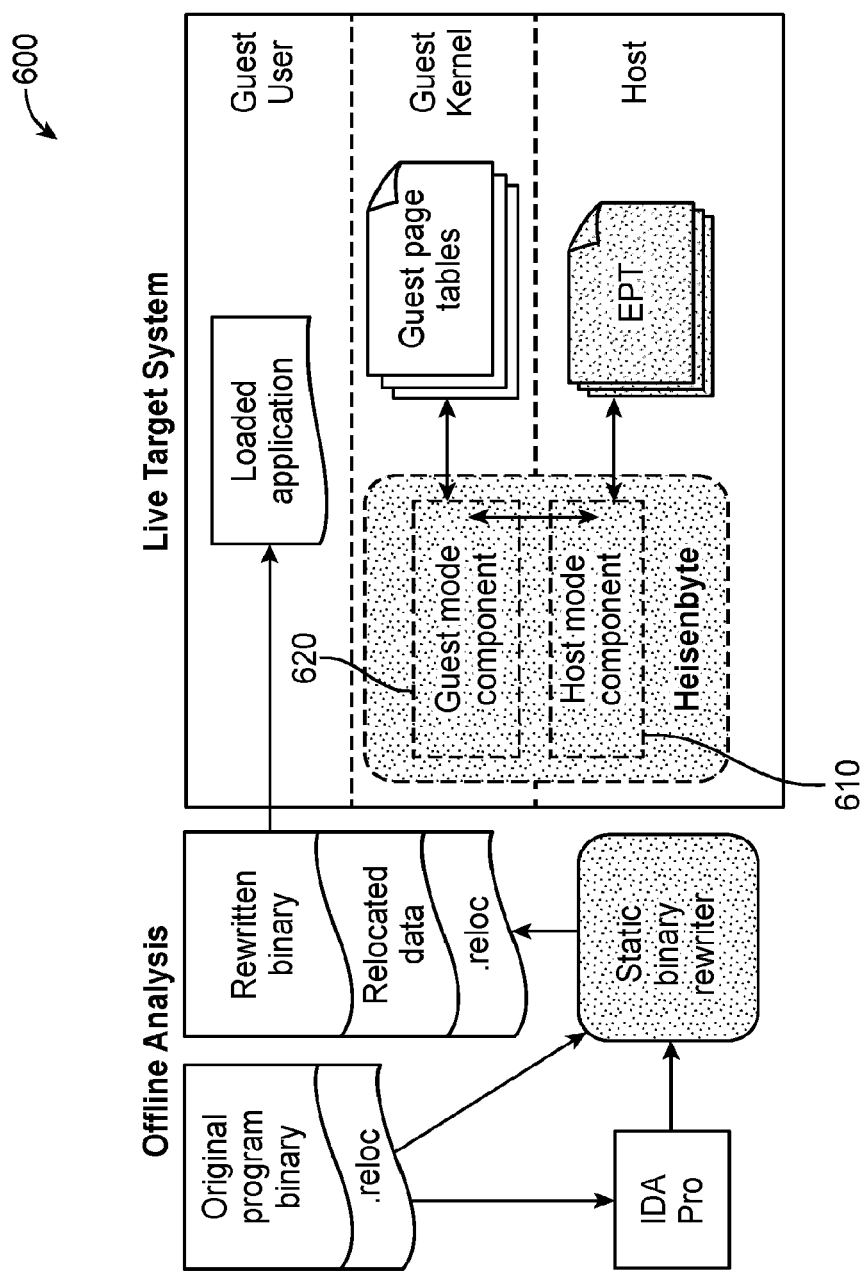
FIG. 6 is a diagram of another example Heisenbyte system implementation.

In some embodiments, a host mode component 610 (shown in FIG. 6, providing an overview of an example system 600 with Heisenbyte implementation components depicted in shaded gray) of the implemented driver ensures that the running system functions as usual, by configuring the EPT structures to use identity mappings from the guest physical to host machine addresses. In those implementation, the host mode component 610 is in a position to configure the execute-only permissions transparently of the guest operating system. It is to be noted that in the example embodiments of FIG. 6, the system 600 may also include an offline analysis module 630, which may be similar (in configuration and/or functionality) to the offline-preparation stage 410 of the implementation 400 depicted in FIG. 4.

As noted, destructive read operation may be realized by first determining the code portions (stored in memory pages) corresponding to executable code, and setting permission flags (e.g., execute-only permission flags to monitor and respond to general-purpose memory access of memory locations containing executable code). Before execute-only permissions (e.g., EPT execute-only permissions) can be configured, identifying which executable memory pages to monitor needs to be performed. To achieve that, in some embodiments, a process to track when and where executable memory from processes are loaded and mapped may be implemented. More particularly, to deal with static code, a Heisenbyte implementation guest mode component 620 (in the example implementation of FIG. 6) begins its initialization by, for example, registering Windows kernel-provided callback functions associated with the creation/exiting of processes and loading/unloading of shared libraries. Using, for example the callback registration APIs, PsSetCreateProcessNotifyRoutine and PsSetLoadImageNotify, the driver guest component is informed whenever a new static code process or library gets loaded. This callback mechanism applies to both executable files and shared library files. If a newly loaded static image matches within a whitelist of binaries that are to be protected, the guest mode component 610 parses the memory-mapped PE header to get the list of guest virtual addresses and sizes of the executable sections in each loaded image. With the guest virtual addresses, the corresponding guest page table and guest physical addresses for each virtual memory page need to be retrieved to configure the EPT entries. However, because the OS performs a "lazy" allocation when doing the memory mapping, these memory pages may not be paged into memory yet. As a workaround, the Heisenbyte implementations described herein may be configured to schedule a thread within the context of the target process and access one byte in each memory page to invoke the paging-in mechanism. Furthermore, the Heisenbyte implementations may use the MmProbeAndLockPages kernel API to make the pages resident in the physical memory, so that they cannot be paged out (this results in increasing the memory working set of a program). This information is stored in a queue buffer shared by the guest mode and host mode components. It is to be noted that because the guest mode component runs, in some embodiments, in the VMX non-root guest mode, it may have no access to the EPTs. The configuration of the EPT mappings has to be performed by the host mode component 610.

Unlike the loading of static binaries into memory, dynamic memory buffer creation/freeing does not have convenient kernel-provided callbacks. Furthermore, the protection bits of a dynamic buffer may change at runtime during the generation and execution of dynamic code. For example, a JIT-enabled browser, like Safari, first allocates a writable (read/write RW) buffer as a code cache to fill with generated native code. With the assumption that hardware W⊕X DEP is enforced, a JIT engine has to remove the writable permission and make the code cache executable (read/execute RX) before executing the code cache. If the dynamic code cache subsequently needs to be modified, the buffer is restored to a writable (read/write RW) one before changes to the code cache can be made. Based on the lifetime of the buffer during which the code is ready to be executed, generally only the buffer needs to be monitored during this period of time. Specifically, a dynamic buffer is tracked when the protection bits change from non-executable to executable, and tracking of the dynamic executable buffer is stopped when it is freed or when the executable bit(s) is/are removed.

In Windows-specific implementations, operations that are used to free or change protection bits of memory use two functions in ntdll.dll, NtFreeVirtualMemory, and NtProtectVirtualMemory respectively, just before invoking the system calls to the kernel services. More particularly, as noted, JIT memory pages are memory buffers created at runtime, often by web browsers, for speed optimization. In web browsers, web scripting languages like javascript are compiled at runtime into native code. These executable native code is dynamic in the sense that when the javascript code changes, the underlying native code in the memory pages also changes. To facilitate these "on-the-fly" executable memory pages, specific memory allocation and permission modification functions are invoked. To track JIT executable pages, the entry points of, for example, the NtFreeVirtualMemory and NtProtectVirtualMemory are hooked so that the first few instructions in these functions are overwritten to execute an augmented piece of setup code to perform the initialization of the data structures before resuming the original execution of these functions.

When ntdll.dll is loaded into the target process, the entry points of these two functions are modified with trampolines to a Virtual Memory (VM)-tracking code that resides on a dynamically allocated page. Because the function hooking is performed in-memory, the OS Copy-on-Write mechanism ensures that these hooks only apply to the target process. In practice, dynamic memory buffers are created and freed very frequently. Since only executable buffers are of interest, an auxiliary bitmap data page may be used to indicate if an executable buffer of a given virtual address has been previously tracked. This added optimization allows the VM-tracking code to decide if it should handle specific events. The VM-tracking code that monitors the changing of protection bits of buffers performs a hypercall to the host mode component whenever an executable buffer is configured to be non-executable, and vice versa. The host mode component updates the address bitmap depending on whether a new executable page is being tracked or removed from tracking. Conversely, the VM-tracking code that monitors the freeing of executable buffers will perform a hypercall when it determines from the bitmap that a buffer with a given virtual address is being freed. The host mode component will then reset the EPT mapping for the physical pages of the buffer to an identity mapping, effectively stopping the tracking of this dynamic executable buffer.

The VM-tracking code resides on a dynamically allocated executable page, and is protected by the Heisenbyte implementations just like any typical executable memory page. Conversely, by being configured to be read-only from the userspace, the auxiliary bitmap is protected from any tampering attacks originating from the userspace; it can only be modified in the host kernel mode (specifically by the host mode driver component). Furthermore, a XOR-based checksum of the bitmap is maintained and verified before the bitmap is updated in the host mode component.

One challenge in using EPT to enforce execute-only memory is that the guest physical memory pages may be shared by multiple processes due to the OS's Copy-on-Write (COW) optimization. This COW mechanism is a common OS optimization applied to static binaries to conserve physical memory and make the startup of programs faster. Thus the OS may duplicate the original page into a newly allocated physical page only when the process writes to the memory page. Before these physical memory pages are duplicated by COW, they may be shared by multiple processes. Enforcing execute-only permissions on these shared guest physical pages may result in many #EPT violations triggered by processes that may not need to be monitored and may thus cause unnecessary overhead. In some embodiments, the implementations described herein, including the Heisenbyte implementations, overcome this problem by inducing COW on the executable memory pages of target processes. The guest OSes' innate COW capability to transparently allocate new physical memory pages for the static code regions of processes to be protected can thus be leveraged. To invoke COW on the memory pages of processes, the write operation should occur in the context of the process; a write operation originating from the hypervisor into the memory space of a user process will not trigger the copy-on-write mechanism. When a static binary is loaded into memory, the Heisenbyte implementations may be configured to schedule an Asynchronous Procedure Call thread to execute in the context of the target process. This thread suspends the execution of the original target process, enumerates the static code regions of the process using the PE headers mapped in the address space, and performs a read and write operation on each executable memory page. This identity-write operation can be efficient since only one byte in each 4 kB memory page needs to be processed. The OS detects this memory write and invokes the COW mechanism. In this manner, each executable static page in a process will no longer share a physical page with another process. The executable memory pages are then configured to be read-only using EPT by the host mode component only after the COW-inducing thread has completed processing all the executable memory pages of the newly loaded binary.

Figure 7:
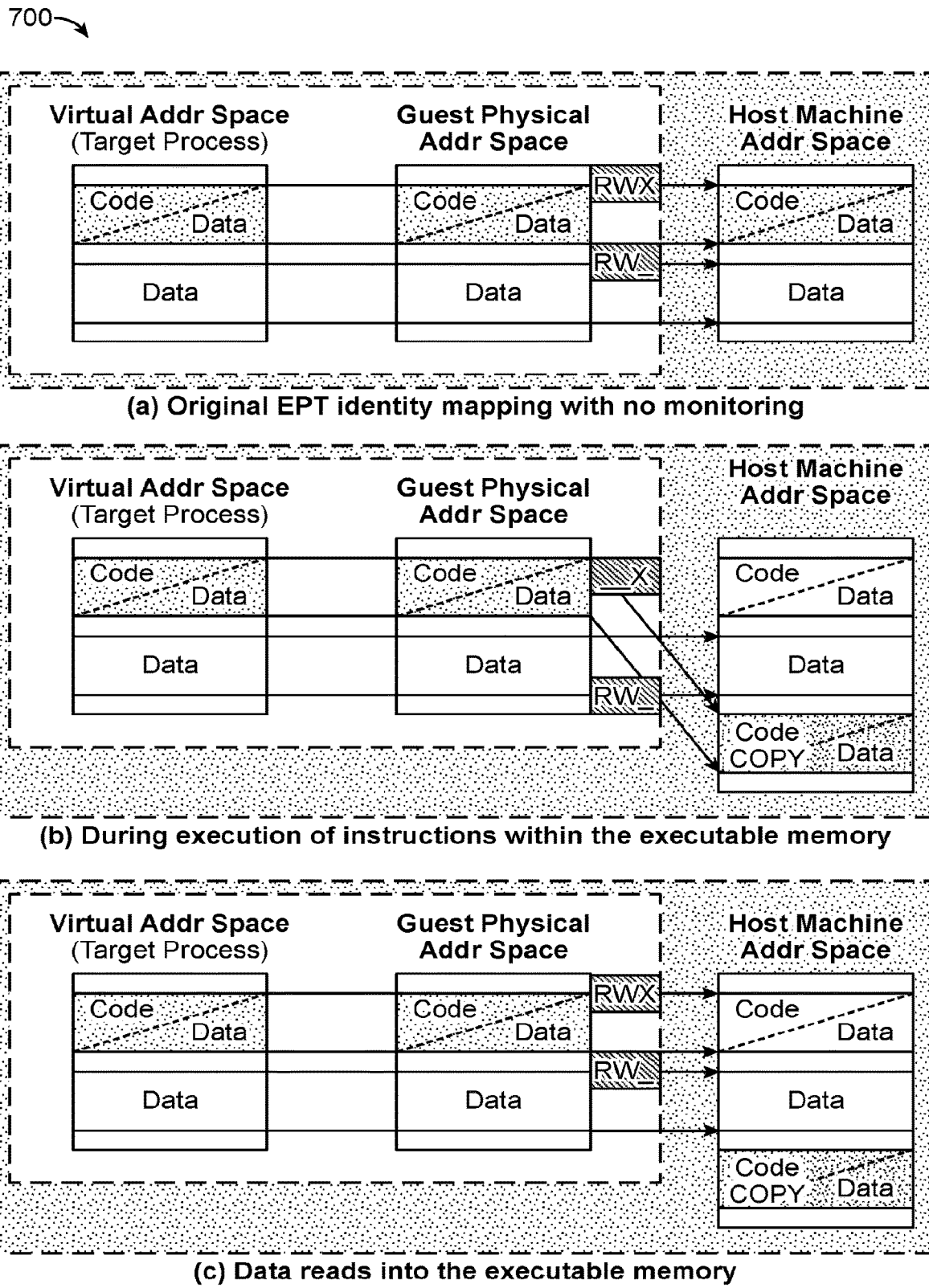
FIGS. 7(a)-(c) are diagrams depicting an example process in which an EPT is used to maintain separate code and data views.

As noted, to implement the destructive code read operations described herein while allowing legitimate data reads in executable memory to function properly, separate code and data views may be maintained for each executable memory page being protecting. The EPT can be leveraged to transparently redirect the use of any guest virtual address to the desired view at runtime. FIGS. 7(a)-(c) are diagrams depicted an example process in which the EPT is used to maintain separate code and data views. As shown in FIG. 7(a), before a target process can be protected, an identity EPT mapping of the guest physical to host machine memory is generated and maintained. After identifying the guest physical memory pages to protect, a duplicate page is added in a host machine address space. Any subsequent instructions being executed are redirected to the code copy memory page shown at the bottom of FIG. 7(b). The guest physical page is configured to be execute-only using EPT.

With the executable pages configured to trigger a VM exit upon a data read, an #EPT violation handler in a host mode component (such as the host mode component 610 of FIG. 6) of the driver can intervene and mediate at these events. At each #EPT read violation, the data read address within the code copy page is overwritten with one or more random bytes. This constitutes the destructive nature of the code reads. Because there are legitimate data reads into executable memory from the kernel, especially during PE loading, the byte garbling may be performed only when the read operation originates from user-space.

Next, the EPT entry is edited to have read/write/execute access and redirect the read operation to read from the original code page, now intended exclusively to service data read requests, as shown in FIG. 7(c). To restore the memory protection, the single-step trap flag is set in the EFLAGS so that a VM exit is triggered immediately after the instruction performing the read operation. At this point, the EPT permissions may be restored to execute-only to restore operation.

In some embodiments, the systems, methods, and other implementations described herein provide a functionality to gracefully terminate, instead of crashing, the process/program that is being targeted by an attack. The implementations described herein may also provide further alert information regarding the attack to the user and enhances the usability of the systems, methods, and other implementations described herein. In addition to detecting and alerting of attacks, crucial information about the faulting malware code, stack dump, and location of the vulnerability associated with the attack may be extracted. This aids forensics operations, and may be used to identify the system or program vulnerability so that a vendor, or the user, may be able to repair the targeted program (through, for example, a vendor-issued patch). Alternatively and/or additionally, an identified vulnerability may be remedied/mitigated using automated patch generation/self-repair technology.

To achieve this additional remediation functionality, in some embodiments, instead of using randomized bytes for the destructive code reads, the systems, methods, and other implementations described herein may use pre-determined values designated to cause/induce selected software interrupts/traps when executed. Using hardware-assisted virtualization support, the systems, methods, and other implementations described herein are configured to remediate when specific software interrupts occur. When malicious code attempts to execute code that has been changed due to earlier read operations, the execution of the replaced/changed bytes invokes the designated interrupt, thus transferring execution control to the hypervisor component of the implementations described herein. At this point, the pertinent information about the attempted code execution, such as the faulting instruction address, and the original and modified contents of the executable memory address, is captured and may be communicated to a user-space component of the implementations described herein. The user-space component may be configures to perform a stack dump by walking the program stack in memory and then logs the forensics information about the attack to a file. It is also configured to display a summary of the attack information to the user in the form of a dialog box to alert the user of the attack. The user can terminate the program gracefully by responding to the alert dialog box, or may choose to restore the original execution of the program should the user believe that this alert event is an erroneously identified attack.

Figure 8:
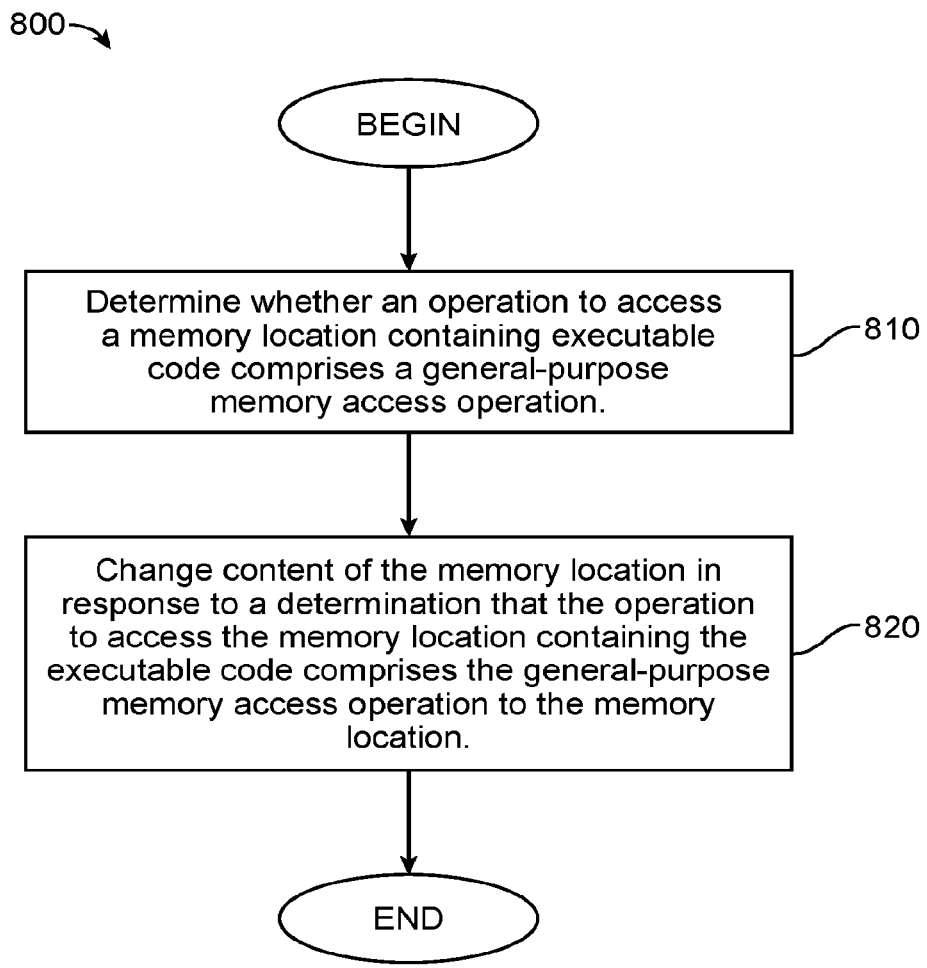
FIG. 8 is a flowchart of an example destructive code read procedure to protect against computing attacks.

With reference now to FIG. 8, a flowchart of an example destructive code read procedure 800 to protect against computing attacks is shown. The procedure 800 includes determining 810 whether an operation to access a memory location containing executable code comprises a general-purpose memory access operation (e.g., a read operation, a memory dereferencing operation, etc.) As noted, the implementations described herein may, in some embodiments, include an offline-preparation stage to separate at least some of the content to be protected into data-only portions (e.g., that match pre-defined data structure) and portions that contain executable code. Thus, in such embodiments, the procedure 800 may further include identifying from received input data one or more executable code portions and one or more non-executable data portions, and placing the one or more executable code portions in first areas of the memory. Identifying from the received input data the one or more executable code portions and the one or more non-executable data portions may include performing disassembly processing on the received input data to generate resultant disassembled data, and identifying from the resultant disassembled data the one or more executable code portions and the one or more non-executable data portion. Identifying from the received input data the one or more executable code portions and the one or more non-executable data portions may, in some embodiments, include determining whether portions of the received input data match one or more pre-defined data structures to identify the one or more non-executable data portions, and placing the identified non-executable data portions into second areas, separate from the first areas in which the executable code portions are placed. Thus, in such embodiments, a first-pass, best-effort, determination of what is code and what is data may be performed via offline disassembly and binary rewriting.

As described herein, in some embodiments, the procedure 800 may include performing an initialization stage (such as the initialization stage 420 of the implementation 400 depicted in FIG. 4) during which a determination is made as to which of areas of the memory of the computing system (executing the processes to be protected) contain portions of executable code. Those memory areas (e.g., memory pages) that are identified as containing portions of executable code are then associated with appropriate access permission flags (e.g., execute-only flags). For example, in some embodiments, associating memory areas of the computing system with access permissions that are associated with the portions of executable code may include maintaining in a hardware virtualization module (such as, for example, extended-page-tables (EPT) implementations for Intel-based computing systems, nested-page-tables (NPT) implementations for AMD-based computing systems, etc.), configured to map virtual memory addresses to physical host machine addresses, execution information identifying the one or more areas of the memory containing the portions of the executable code as being execute-only memory areas. In such embodiments, a determination that the operation to access the memory location is the general-purpose memory access and a further determination that the memory location being accessed is in a memory area from the one or more areas of the memory identified as the execute-only memory areas, causes a hardware-virtualization violation to occur (e.g., an #EPT violation for EPT implementations). In some embodiments, the procedure 800 may also include generating duplicate copies of the one or more areas of the memory, associated with the portions of executable code, in another one or more areas of the memory in order to be able to have un-garbled copies of the code and data being modified (as part of the destructive read implementations described herein) to service legitimate data reads from memory pages that are marked as executable. It is to be noted that a memory page marked as executable can contain both legitimate data and executable code. The assumption made here is that the bytes within this memory page may only be used as either data or code, but not both.

With continued reference to FIG. 8, the procedure 800 further include changing 820 content of the memory location in response to a determination that the operation to access the memory location containing the executable code includes the general-purpose memory access operation to the memory location (such as the memory read operation, the dereferencing operation, etc.) In some embodiments, changing the content of the memory location in response to the determination that the operation to access the memory location containing the executable code comprises the general-purpose memory access operation to the memory location may include replacing the content of the memory location with a random value in response to the determination that the operation to access the memory location containing the executable code comprises the general-purpose memory access operation to the memory location.

In some embodiments, changing the content of the memory location may include replacing the content of the memory location with a selected one of one or more predetermined values associated with respective one or more software interrupts or software traps. In such embodiments, the procedure 800 may further include performing a software interrupt based on the replaced content of the memory location to cause a capture of data associated with one or more processes resulting in the software interrupt. The captured data associated with the one or more processes resulting in the software interrupt may be used to perform one or more of, for example, identifying a malware attack that caused the software interrupt, identifying vulnerabilities in a targeted program comprising the executable code in the memory location, repairing one or more of the identified vulnerabilities, and/or providing output information to a user regarding the software interrupt. In some embodiments, the procedure 800 may further include receiving reply information from the user responsive to the output information provided to the user, and performing, based on the received reply information from the user, one of, for example, terminating execution of the targeted program, and/or restoring execution of the targeted program.

Figure 9:
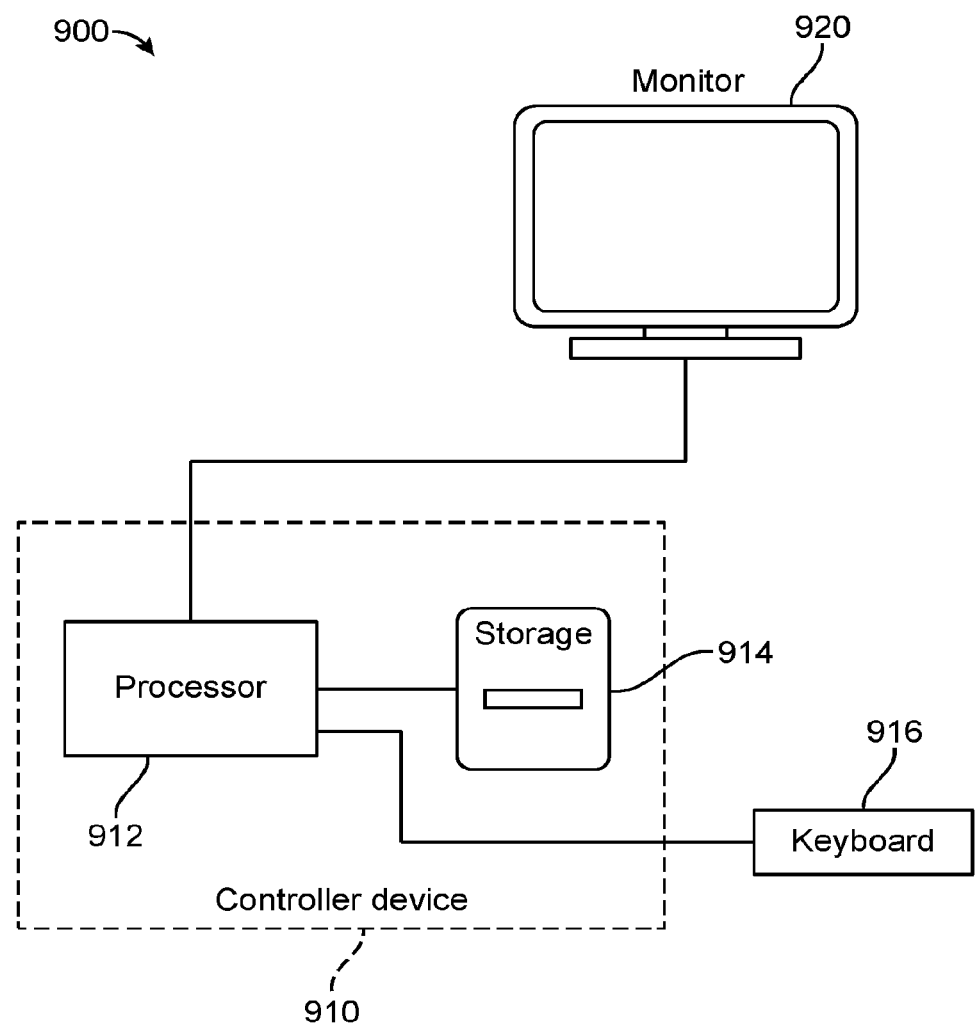
FIG. 9 is a schematic diagram of a generic computing system.

Performing at least some of the operations described herein may be facilitated by a processor-based computing system. Particularly, at least some of the various devices/systems/units described herein may be implemented, at least in part, using one or more processor-based devices. With reference to FIG. 9, a schematic diagram of a generic computing system 900 is shown. The computing system 900 includes a processor-based device 910 such as a personal computer, a specialized computing device, and so forth, that typically includes a controller, such as a central processor unit 912. In addition to the CPU 912, the system includes main memory, cache memory and bus interface circuits (not shown in FIG. 9). The processor-based device 910 may include a mass storage element 914, such as a hard drive or flash drive associated with the computer system. The computing system 900 may further include a keyboard, or keypad, or some other user input interface 916, and a monitor 920, e.g., a CRT (cathode ray tube) or LCD (liquid crystal display) monitor, that may be placed where a user can access them.

The processor-based device 910 is configured to perform at least some of the operations/procedures described herein. The storage device 914 may thus include a computer program product that when executed on the processor-based device 910 causes the processor-based device to perform operations/procedures described herein. The processor-based device may further include peripheral devices to provide input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to provide general operation of the respective system/device. Alternatively and/or additionally, in some embodiments, special purpose logic circuitry, e.g., an FPGA (field programmable gate array), an ASIC (application-specific integrated circuit), a DSP processor, etc., may be used in the implementation of the system 900. Other modules that may be included with the processor-based device 910 are speakers, a sound card, a pointing device, e.g., a mouse or a trackball, by which the user can provide input to the computing system 900. The processor-based device (or other controller-type device) 910 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

To test and evaluate the performance of the implementations described herein, several experiments were conducted on a 32-bit Windows 7 operating system running on a quad-core Intel i7 processor with 2 GB RAM. An Internet Explorer (IE) 9 memory disclosure vulnerability (CVE-2013-2551), that realized a heap overwrite vulnerability involving a Javascript string object, was used. This implementation of Internet Explorer allows an adversary to perform arbitrary memory read and write operations repeatedly without causing IE to crash. On the test setup, an exploit was developed that leveraged this memory disclosure bug as a memory read and write primitive. Because ASLR is enabled by default (Window's ASLR is a coarse-grained form that changes only the base addresses of the shared libraries at load time), the exploit had to look for suitable code reuse "gadgets" to string together as an attack payload.

To demonstrate that the systems, methods, and other implementations described herein, work with an exploit that uses disclosed executable memory contents, the exploit was crafted to dynamically locate a stack pivot ROP gadget. The exploit begins by first leaking the virtual table pointer associated with the vulnerable heap object. This pointer contains an address in the code page of VGX.dll shared library. Using the memory read primitive, the exploit scans backwards in memory for the PE signature MZ to search for the PE header of the shared library. It is to be noted that if Internet Explorer uses any code within the range of bytes the exploit has scanned, Internet Explorer will crash due to the corruption of legitimate code by the destructive code reads. It is assumed that the exploit avoids scanning executable memory during this stage and only reads non-executable memory. When the exploit finds the PE header of the library, it can then derive the base address of user32.dll by parsing the import address table in the PE header. The shared library user32.dll contains a set of ROP gadgets that are found offline. With this, the exploit can construct its ROP payload by adjusting the return addresses of the predetermined ROP gadgets with the base address of user32.dll. To simulate the dynamic discovery of "gadgets" in a dynamic code reuse exploit, the exploit was developed to perform a 4-byte memory scan at the location of the stack pivot gadget, and then redirect execution to that stack pivot gadget.

While the actual system uses a randomized byte to garble the code, fixed 0xCC byte (i.e. a debug trap) was used for the code corruption in the experiments conducted herein to evaluate the present implementations. This ensured that any crash was directly caused by the destructive code reads. When control flow is redirected to the stack pivot gadget, Internet Explorer crashed at the address of the stack pivot with a debug trap. This demonstrated that the Heisenbyte implementations described herein stem the further progress of the exploit as a result of corrupted byte caused by the exploit's executable memory read. Furthermore, the Windbg debugger can be configured to automatically launch upon application crash. When the debugger is invoked at the crash address at the location of the stack pivot, the debugger displays and disassembles the original byte sequence of the stack pivot gadget in user32.dll. As the debugger reads memory as data read operations, the original bytes at that code address are shown. It is apparent that what gets executed is different from what gets read. This further demonstrated that the Heisenbyte implementations described herein correctly maintain separate code and data views of executable memory.

To further evaluate the systems, methods, and other implementations described herein, on memory disclosure attack on dynamically generated code, a vulnerable program was realized that mimicked the behavior of a JIT engine in the creation of dynamic executable buffers. The program allocated a readable and writable buffer and copied into this buffer a pre-compiled set of instructions that used a jump table. This is similar to the behavior of legacy JIT engines that emit native code containing both code and data in the dynamic buffer. With the code cache ready to execute, the program made the dynamic buffer executable by changing the permission access to readable/executable, and executed the buffer from the base address of the buffer. The program functioned correctly with the Heisenbyte implementations running. Because the jump tables in the dynamic buffer were only ever used as data in the lifetime of the buffer, the Heisenbyte implementations properly supported the normal functionality of the simulated JIT-ed code.

To simulate an attack that scans the memory of the dynamic code region for code reuse gadgets, another exploit was developed and realized to leverage a memory disclosure bug that was realized into the program. The exploit used this bug to read the first four bytes of the dynamic buffer and redirected execution control to the start of the dynamic buffer. As in the case of the experiments with Internet Explorer 9, the vulnerable program crashed at the base address of the dynamic buffer as a result of the destructive code reads induced by the Heisenbyte implementations.

Figure 10:
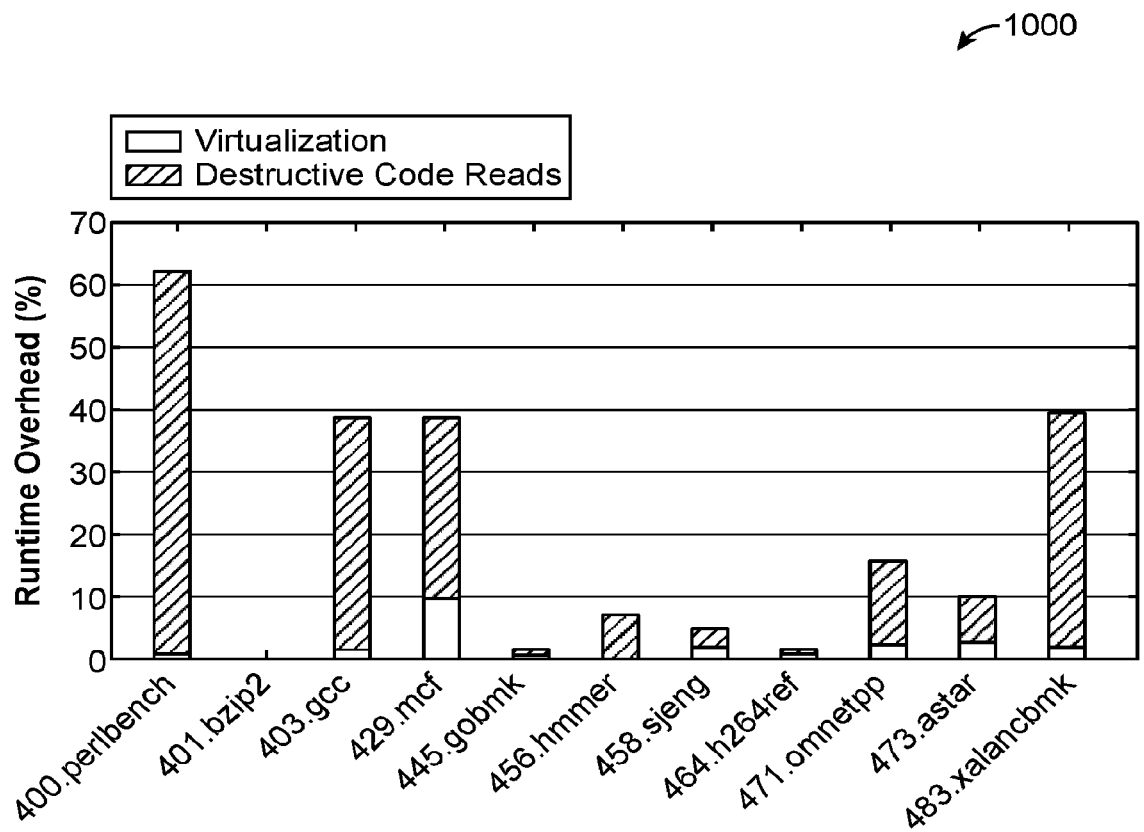
FIG. 10 is a graph showing the execution overhead for a SPEC2006, compared to a baseline system.

The performance overhead for the implementations described herein was also tested and evaluated. The slowdown caused by various components of the Heisenbyte implementations was measured using the SPEC2006 integer benchmark programs. Because the solution works on, and rewrites, binaries, the programs were first compiled, and the compiled programs were used under the assumption that no source code was available. The SPEC2006 programs were compiled with Microsoft Visual Studio 2010 compiler using the default linker and compilation flags. For all the tests, each set of runs was started on a rebooted system, three (3) iterations were performed using the base reference input, and the median measurements were used. The execution slowdown caused by the Heisenbyte implementations to an originally non-virtualized system was evaluated. The overhead of the Heisenbyte implementations included two main sources: the overhead as a result of virtualizing the entire system at runtime, and the overhead of incurring two VM exits for each destructive code read operation. Separating the measurements for the two allowed evaluating the overhead net of virtualization when the Heisenbyte implementation were deployed on existing virtualized systems. To measure the overhead caused by purely virtualizing the system, the SPEC benchmarks were run with the Heisenbyte driver loaded, but without protecting any binaries or shared libraries. As illustrated in FIG. 10, providing a graph 1000 showing the execution overhead for a SPEC2006, compared to a baseline system, the virtualization overhead ranged from 0% (401.bzip2) to 9.6% (429.mcf). The virtualization overhead was highly dependent on the execution profile of the programs. The high overhead for 401.bzip2 is attributed to the paging operations performed by Intel EPT hardware page walker. On average, the geometric mean of the virtualization overhead caused by the Heisenbyte implementation was 1.8% across all the programs. With the measurements for the virtualization overhead, the overhead of the destructive code reads due to the incomplete removal of legitimate data from the executable memory pages can be measured. The Heisenbyte implementations can be configured to protect the SPEC binaries and all the shared DLL libraries used by SPEC, and compare the execution time to the baseline. The variance in this overhead is large, depending on how much legitimate data is not removed by the binary rewriting. The destructive code read overhead ranged from 0% (401.bzip2) to 62% (400.perlbench), with an average of 16.5% across the programs. This overhead was a direct consequence of the imperfect removal of legitimate data from the executable memory pages at the binary rewriting stage. The higher the frequency a program accesses such legitimate data in the memory pages, the greater the overhead incurred by the destructive codes. The average of the combined virtualization and destructive code read overhead was 18.3%. While in the experiments conducts herein the types of data that were to be relocated out of the executable sections during the binary rewriting were conservatively selected in order to show that the system can still tolerate the incomplete relocation of all data from the executable sections, the overhead can be even further reduced with a more aggressive strategy in removing such data.

Figure 11:
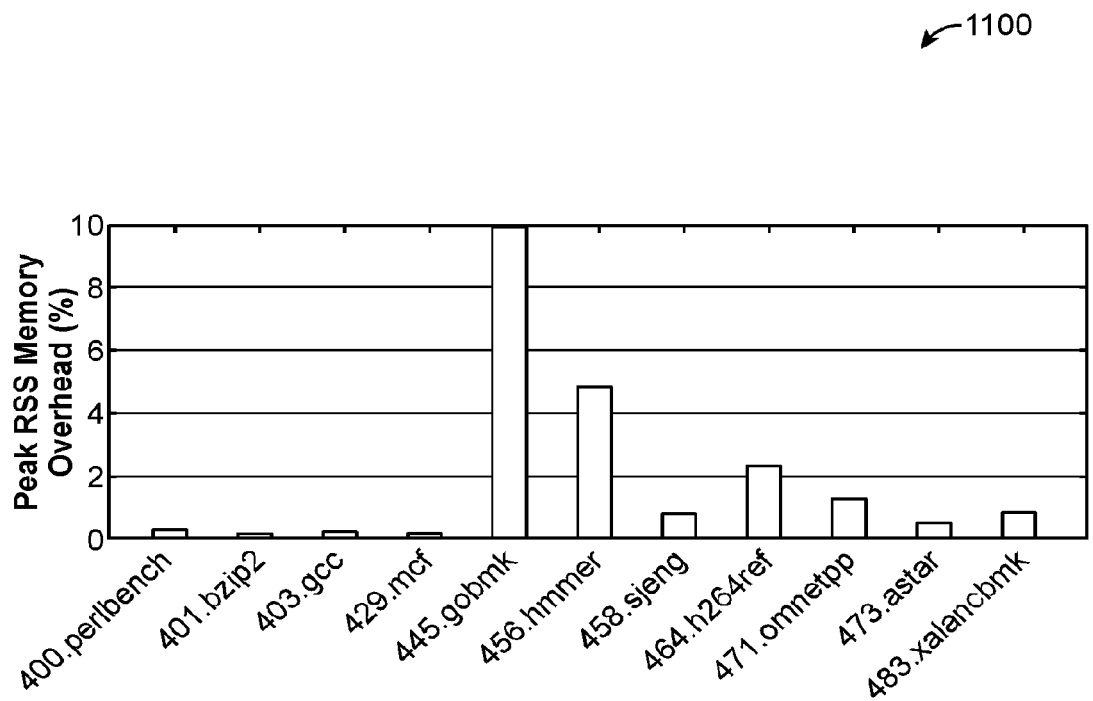
FIG. 11 is a graph illustrating memory overhead in terms of peak RSS.

In some embodiments, the Heisenbyte implementations require keeping the executable memory pages resident in physical memory when configuring the EPT permissions and monitoring for data reads to these pages. The experiments that were conducted also evaluated how much more physical memory overhead the Heisenbyte implementations caused. This is measured by tracking the peak Resident set size (RSS) of a process over entire program execution. RSS measures the size of process memory that remains resident in the RAM or physical memory. A profiling thread is injected to the processes to log the current maximum RSS as the process runs every 20 seconds. FIG. 11, providing a graph 1100 illustrating memory overhead in terms of peak RSS, shows a modest increase of 0.8% on average in the peak RSS across all the programs.

It is to be noted that in the experiments conducted to test and evaluate the performance of the Heisenbyte implementations, the operand size of the instruction performing the reads into the executable memory was not considered, and destructive code reads of only one byte were performed. An adversary who uses data reads of four bytes to scan the memory could potentially exploit these experimental configurations. Garbling only one byte would give the adversary the potential to use the remaining three bytes from the data reads. To tackle this problem, the Heisenbyte implementations can be extended to handle code reads using different operand sizes. Three hash tables can be maintained, each storing the opcodes used for 1-byte, 2-byte and 4-byte operands. Whenever a code read happens, the Heisenbyte implementations can look up the hash table to determine efficiently the size of operand and destroy the same number of bytes accordingly.

It is also to be noted that the Heisenbyte implementations require fine-grained ASLR to ensure that the layout of code cannot be inferred with partial reads into the non-executable sections. Fine-grained ASLR can be extended in the Heisenbyte implementations in a number of ways. For example, because the binaries are being rewritten, fine-grained ASLR such as in-place code randomization, can be extended into the rewriting process. As no additional code is introduced, such in-place code randomization may have limited impact on code locality, and thus incurs modest (even negligible) runtime overhead.

In some embodiments, the Heisenbyte implementations are realized with a standard virtualization features found in most processors. The goal was to provide a baseline proof-of-concept implementation. As described herein, a major source of overhead comes from inducing the VM exits to implement the destructive code reads. This can be reduced substantially with the combined use of two new virtualization features provided in some processors (e.g., a Haswell processor). These processors may be configured to allow selected #EPT violations to be converted to a new type of exception that does not require VM exits to the hypervisor. The latency of VM exits can then be reduced substantially. This exception is known as the #VE Virtualization Exception. With this feature, during the active monitoring mode, a data read into protected executable memory pages will trigger an exception, and control will be handed over to the guest OS #VE Interrupt Service Handler (ISR). To handle the configuration of EPT entries, a second feature, named EPT Pointer switching, allows the guest OS to efficiently select within a pre-configured set of EPT pointers having the required EPT permissions needed.

As an optimization to aid the offline static analysis, in some embodiments, the Heisenbyte implementations can be augments to record into a log buffer all read operations into executable memory. This log can then be used to direct the static analysis in determining if a set of bytes within an executable section is indeed intended as data at runtime. The binaries can be analyzed and rewritten repeatedly using this information to achieve a high code coverage over time. This can further reduce the overhead of the system, since the data reads that previously trigger VM exits will no longer occur.

As noted, in some embodiments, graceful remediation may be implemented. Instead of using randomized "junk" bytes for the code corruption, the Heisenbyte implementations can use specific bytes designated to induce selected traps when executed. These techniques may provide graceful termination of any malicious code execution and provide a dump of the faulting code addresses and stack dump.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
   determining, by a processor-based device, whether an operation to access a memory location containing executable code representative of a decodable instruction executable on the processor-based device comprises one of a plurality of general-purpose memory access operations that do not cause execution of the decodable instruction on the processor-based device; and
   performing, by the processor-based device, the operation to access the memory location to read from the memory location the executable code representative of the decodable instruction; and
   overwriting the memory location by the processor-based device, in response to a determination that the operation to access the memory location containing the executable code representative of a decodable instruction is a general-purpose memory access operation from the plurality of general purpose memory access operations, with a new content different than the executable code after reading the executable code from the memory location.

2. The method of claim 1, wherein determining whether the operation to access the memory location containing the executable code comprises the one of the plurality of general-purpose memory access operations comprises:
   determining whether the operation to access the memory location comprises one or more of: a memory read operation, or a memory dereferencing operation.

3. The method of claim 1, further comprising:
   identifying at run-time one or more areas of memory of a computing system as containing portions of executable code; and
   associating the one or more areas of the memory of the computing system with respective access permissions associated with the portions of executable code.

4. The method of claim 3, wherein determining whether the operation to access the memory location containing the executable code comprises the one of the plurality of general-purpose memory access operations comprises:
   determining whether the operation to access the memory location violates the respective access permission associated with an area of memory, from the one or more areas of memory, that includes the memory location containing the executable code.

5. The method of claim 3, wherein associating the one or more areas of the memory of the computing system with the respective access permissions associated with the portions of executable code comprises:
   maintaining in a hardware virtualization module, configured to map virtual memory addresses to physical host machine addresses, execution information identifying the one or more areas of the memory containing the portions of the executable code as being execute-only memory areas;
   and wherein the method further comprises:
   causing a hardware-virtualization violation in response to the determination that the operation to access the memory location is the general-purpose memory access operation and a further determination that the memory location being accessed is in a memory area from the one or more areas of the memory identified as the execute-only memory areas.

6. The method of claim 3, further comprising:
   generating a duplicate copy of the one or more areas of the memory, configured with the respective access permissions associated with the portions of executable code, in another one or more areas of the memory.

7. The method of claim 1, wherein overwriting the memory location with the new content comprises:
   replacing the content of the memory location with a random value in response to the determination that the operation to access the memory location containing the executable code comprises the general-purpose memory access operation to the memory location.

8. The method of claim 1, wherein overwriting the memory location with the new content comprises:
   replacing the content of the memory location with a selected one of one or more pre-determined values associated with respective one or more software interrupts or software traps.

9. The method of claim 8, further comprising:
   performing a software interrupt based on the replaced content of the memory location to cause a capture of data associated with one or more processes resulting in the software interrupt;
   wherein the captured data associated with the one or more processes resulting in the software interrupt is used to perform one or more of: identifying a malware attack that caused the software interrupt, identifying vulnerabilities in a targeted program comprising the executable code in the memory location, repairing one or more of the identified vulnerabilities, or providing output information to a user regarding the software interrupt.

10. The method of claim 1, further comprising:
    identifying from received input data one or more executable code portions and one or more non-executable data portions; and
    placing the one or more executable code portions in first areas of memory.

11. The method of claim 10, wherein identifying from the received input data the one or more executable code portions and the one or more non-executable data portions comprises:
    performing disassembly processing on the received input data to generate resultant disassembled data; and
    identifying from the resultant disassembled data the one or more executable code portions and the one or more non-executable data portions.

12. The method of claim 10, wherein identifying from the received input data the one or more executable code portions and the one or more non-executable data portions comprises:
    determining whether portions of the received input data match one or more pre-defined data structures to identify the one or more non-executable data portions; and
    placing the identified non-executable data portions into second areas of the memory, separate from the first areas in which the executable code portions are placed.

13. A computing system comprising:
    at least one processor; and
    memory comprising computer instructions that, when executed on the at least one processor, cause operations comprising:
    determining whether an operation to access a memory location containing executable code representative of a decodable instruction executable on the at least one processor comprises one of a plurality of general-purpose memory access operations that do not cause execution of the decodable instruction on the at least one processor;

performing the operation to access the memory location to read from the memory location the executable code representative of the decodable instruction; and overwriting the memory location, in response to a determination that the operation to access the memory location containing the executable code representative of a decodable instruction is a general-purpose memory access operation from the plurality of general purpose memory access operations, with a new content different than the executable code after reading the executable code from the memory location.

14. The computing system of claim 13, wherein the memory comprises further instructions to cause further operations comprising:

identifying at run-time one or more areas of the memory of the computing system as containing portions of executable code; and associating the one or more areas of the memory of the computing system with respective access permissions associated with the portions of executable code.

15. The computing system of claim 14, wherein associating the one or more areas of the memory of the computing system with the respective access permissions associated with the portions of executable code comprises:

maintaining in a hardware virtualization module, configured to map virtual memory addresses to physical host machine addresses, execution information identifying the one or more areas of the memory containing the portions of the executable code as being execute-only memory areas;

and wherein the memory comprises additional instructions to cause additional operations comprising:

causing a hardware-virtualization violation in response to the determination that the operation to access the memory location is the general-purpose memory access operation and a further determination that the memory location being accessed is in a memory area from the one or more areas of the memory identified as the execute-only memory areas.

16. The computing system of claim 14, wherein the memory comprises additional instructions to cause additional operations comprising:

generating a duplicate copy of the one or more areas of the memory, configured with the respective access permissions associated with the portions of executable code, in another one or more areas of the memory.

17. The computing system of claim 13, wherein overwriting the memory location with the new content comprises:

replacing the content of the memory location with a random value in response to the determination that the operation to access the memory location containing the executable code comprises the general-purpose memory access operation to the memory location.

18. The computing system of claim 13, wherein overwriting the memory location with the new content comprises:

replacing the content of the memory location with a selected one of one or more pre-determined values associated with respective one or more software interrupts or software traps.

19. A non-transitory computer readable media storing a set of instructions executable on at least one programmable device that, when executed, cause operations comprising:

determining whether an operation to access a memory location containing executable code representative of a decodable instruction executable on the at least one programmable device comprises one of a plurality of general-purpose memory access operations that do not cause execution of the decodable instruction on the at least one programmable device;

performing the operation to access the memory location to read from the memory location the executable code representative of the decodable instruction; and overwriting the memory location, in response to a determination that the operation to access the memory location containing the executable code representative of a decodable instruction is a general-purpose memory access operation from the plurality of general purpose memory access operation, with a new content different than the executable code after reading the executable code from the memory location.

20. The method of claim 1, wherein overwriting the memory location with the new content comprises:

overwriting the memory location with the new content to corrupt the memory location so as to prevent subsequent execution of the executable code that was stored in the memory location.

* * * * *